US012745072B2

(12) United States Patent
Jiang

(10) Patent No.: US 12,745,072 B2
(45) Date of Patent: Sep. 22, 2026

(54) METHOD AND COMMUNICATION DEVICES FOR TRANSMITTING DATA

(71) Applicant: Beijing Xiaomi Mobile Software Co., Ltd., Beijing (CN)

(72) Inventor: Xiaowei Jiang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 423 days.

(21) Appl. No.: 18/039,891

(22) PCT Filed: Dec. 2, 2020

(86) PCT No.: PCT/CN2020/133379
§ 371 (c)(1),
(2) Date: Jun. 1, 2023

(87) PCT Pub. No.: WO2022/116047
PCT Pub. Date: Jun. 9, 2022

(65) Prior Publication Data
US 2024/0031792 A1 Jan. 25, 2024

(51) Int. Cl.
*H04W 8/08* (2009.01)

(52) U.S. Cl.
CPC .................................... *H04W 8/08* (2013.01)

(58) Field of Classification Search
CPC ....... H04W 8/08; H04W 24/02; H04W 76/10; H04W 24/08
USPC .......................................................... 370/252
See application file for complete search history.

(56) References Cited

U.S. PATENT DOCUMENTS

2017/0222943 A1* 8/2017 Yao ....................... H04L 69/168
2022/0191846 A1* 6/2022 Ren ....................... H04L 5/0094
2022/0201691 A1* 6/2022 Shi ........................ H04L 5/0053

FOREIGN PATENT DOCUMENTS

CN 101414896 A 4/2009
CN 110476445 A 11/2019
CN 111093270 A 5/2020
CN 111953466 A 11/2020
WO 2019097705 A1 5/2019
WO 2020199779 A1 10/2020

OTHER PUBLICATIONS

Huawei etc,"PDCP operation for packet duplication",3GPP TSG-RAN WG2 #99,R2-1707719, Aug. 21-25, 2017.
First Chinese Office Action issued on May 25, 2023 for Chinese Patent Application No. 202080003863.8.
First Chinese Search Report issued on May 23, 2023 for Chinese Patent Application No. 202080003863.8.
3GPP Draft; R1-2009320, Oct. 26, 2020, 3rd Generation Partnership Project (3GPP), Mobile Competence Centre, 650, route des Lucioles, F-06921 Sophia-Antipolis Cedex, France.

* cited by examiner

*Primary Examiner* — Hermon Asres
(74) *Attorney, Agent, or Firm* — Volpe Koenig

(57) ABSTRACT

A method for transmitting data, includes: updating, on the basis of a specified strategy, a boundary value of a data reordering window, where the specified strategy is any one of the following strategies: a first indication message and a preset rule obtained. In this way, through the method for transmitting data, a packet data convergence protocol (PDCP) data reception entity updates the boundary value of the data reordering window according to the specified strategy of a PDCP data transmission entity.

20 Claims, 6 Drawing Sheets

Update, on the basis of a specified strategy, a boundary value of a data reordering window, where the specified strategy is any one of the following strategies: a first indication message and a preset rule obtained, and the first indication message is configured to indicate a boundary value to be updated of the reordering window to a packet data convergence protocol (PDCP) data reception entity

101

Figures 1, 2, 3:
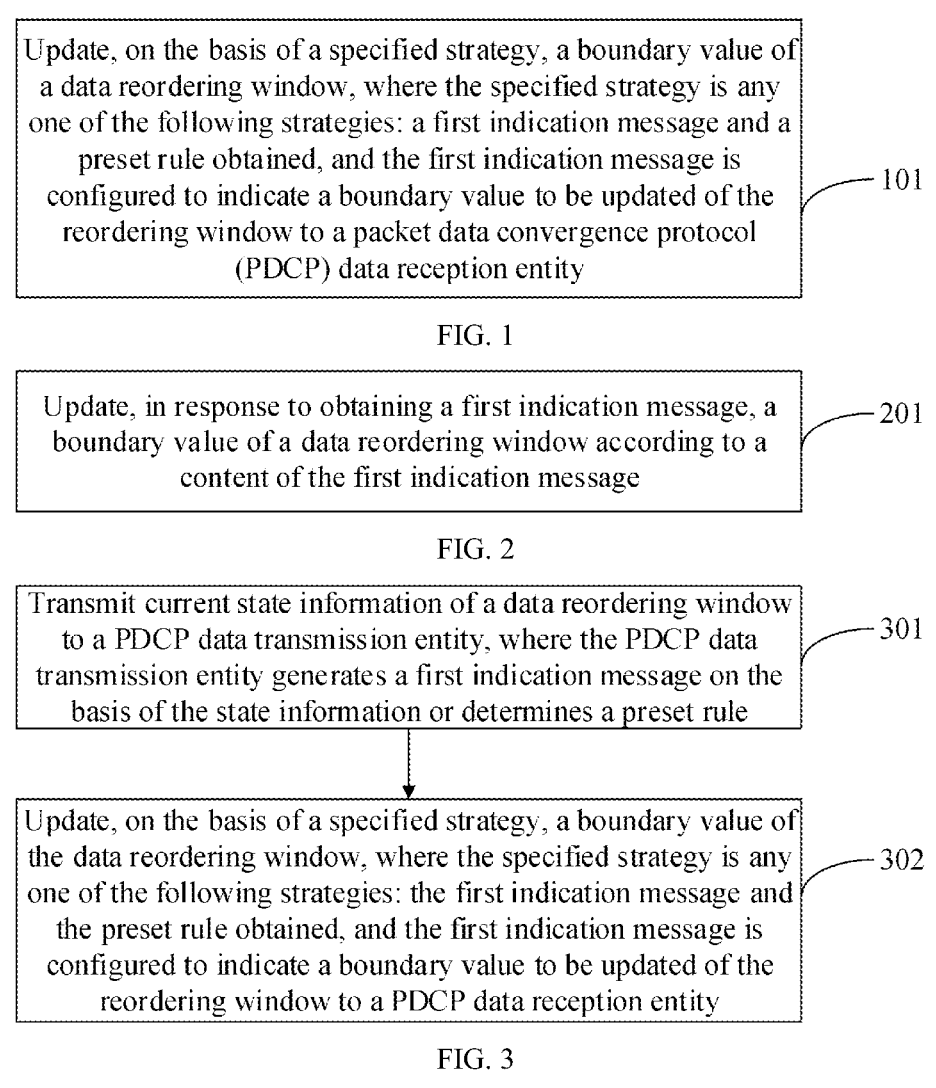

Update, on the basis of a specified strategy, a boundary value of a data reordering window, where the specified strategy is any one of the following strategies: a first indication message and a preset rule obtained, and the first indication message is configured to indicate a boundary value to be updated of the reordering window to a packet data convergence protocol (PDCP) data reception entity

Update, in response to obtaining a first indication message, a boundary value of a data reordering window according to a content of the first indication message

Transmit current state information of a data reordering window to a PDCP data transmission entity, where the PDCP data transmission entity generates a first indication message on the basis of the state information or determines a preset rule

301

Update, on the basis of a specified strategy, a boundary value of the data reordering window, where the specified strategy is any one of the following strategies: the first indication message and the preset rule obtained, and the first indication message is configured to indicate a boundary value to be updated of the reordering window to a PDCP data reception entity

Figures 4, 5:
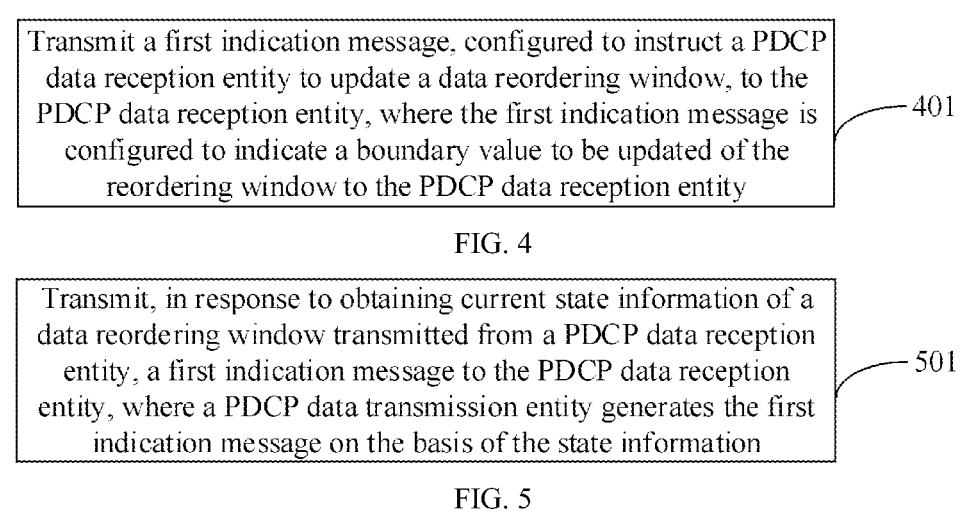

Transmit a first indication message, configured to instruct a PDCP data reception entity to update a data reordering window, to the PDCP data reception entity, where the first indication message is configured to indicate a boundary value to be updated of the reordering window to the PDCP data reception entity

Transmit, in response to obtaining current state information of a data reordering window transmitted from a PDCP data reception entity, a first indication message to the PDCP data reception entity, where a PDCP data transmission entity generates the first indication message on the basis of the state information

METHOD AND COMMUNICATION DEVICES FOR TRANSMITTING DATA

CROSS REFERENCE TO RELATED APPLICATION

The applications is a U.S. National Stage of International Application No. PCT/CN2020/133379, filed on Dec. 2, 2020, the contents of all of which are incorporated herein by reference in their entirety for all purposes.

BACKGROUND

A packet data convergence protocol (PDCP) in a 5th generation mobile communication technology (5G) system includes a PDCP data transmission entity and a PDCP data reception entity. The PDCP data reception entity is configured to receive data transmitted from the PDCP data transmission entity.

SUMMARY

The disclosure relates to the technical field of radio communication, and particularly relates to a method and a communication device for transmitting data An example of an aspect of the disclosure provides a method for transmitting data. The method is performed by a PDCP data reception entity and includes: updating, on the basis of a specified strategy, a boundary value of a data reordering window, where the specified strategy is any one of the following strategies: a first indication message or a preset rule, and the first indication message is configured to indicate the boundary value to be updated of the data reordering window to the data reception entity.

An example of another aspect of the disclosure provides a method for transmitting data. The method is performed by a PDCP data transmission entity and includes: transmitting a first indication message, configured to instruct a data reception entity to update a data reordering window, to the data reception entity, where the first indication message is configured to indicate a boundary value to be updated of the data reordering window to the data reception entity.

An example of yet another aspect of the disclosure provides a communication device. The communication device includes: a transceiver; a memory; and a processor communicatively connected to the transceiver and the memory, wherein the processor is configured to: update, based on a specified strategy, a boundary value of a data reordering window, wherein: the specified strategy is any one of a first indication message or a preset rule, and first indication message is configured to indicate a boundary value to be updated of the data reordering window to the data reception entity.

Additional aspects and advantages of the disclosure will be set forth partially in the following description, which will become obvious in the following description, or can be learned by practice of the disclosure.

BRIEF DESCRIPTION OF THE DRAWINGS

The above and/or additional aspects and advantages of the disclosure will become obvious and comprehensible from the description of examples in conjunction with the drawings.

FIG. 1 is a schematic flow diagram of a method for transmitting data according to an example of the disclosure;

FIG. 2 is a schematic flow diagram of another method for transmitting data according to an example of the disclosure;

FIG. 3 is a schematic flow diagram of yet another method for transmitting data according to an example of the disclosure;

FIG. 4 is a schematic flow diagram of yet another method for transmitting data according to an example of the disclosure;

FIG. 5 is a schematic flow diagram of still another method for transmitting data according to an example of the disclosure;

DETAILED DESCRIPTION

Figure 6:
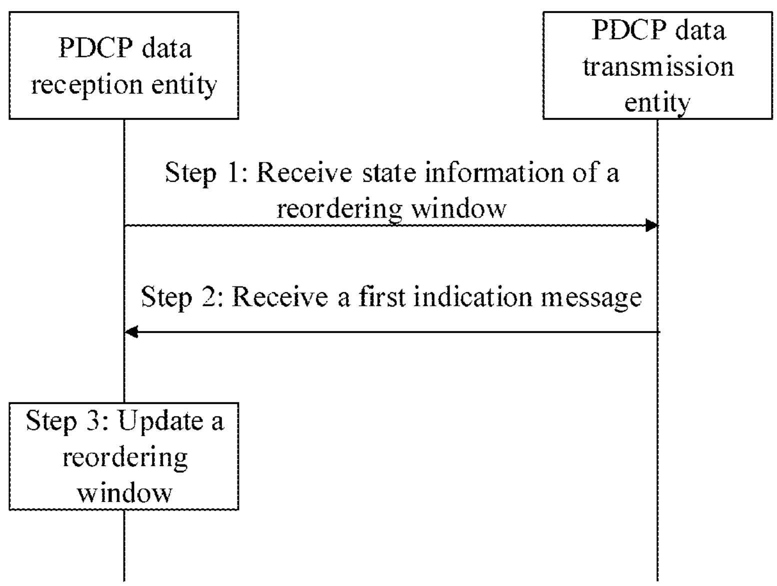
FIG. 6 is a schematic structural diagram of an apparatus for transmitting data according to an example of the disclosure.

Illustrative examples will be described in detail herein and shown in the accompanying drawings. When the following descriptions involve the accompanying drawings, unless otherwise specified, the same numeral in different accompanying drawings denotes the same or similar elements. The embodiments described in the following illustrative examples do not denote all embodiments consistent with the examples of the disclosure. On the contrary, the embodiments are merely instances of an apparatus and a method consistent with some aspects of the examples of the disclosure as detailed in the appended claims.

The terms used in the examples of the disclosure are merely to describe the specific examples, instead of limiting the examples of the disclosure. The singular forms such as “a/an” and “the” used in the examples of the disclosure and the appended claims are also intended to include the plural forms, unless otherwise clearly stated in the context. It is to be further understood that the term “and/or” used herein refers to and includes any of one or more of the associated listed items or all possible combinations.

It is to be understood that although the terms such as first, second, and third may be used to describe various information in the examples of the disclosure, the information is not intended to be limited to the terms. The terms are merely used to distinguish the same type of information from each other. For instance, without departing from the scope of the examples of the disclosure, first information can also be called second information, and similarly, second information can also be called first information. Depending on the context, the words “if” and “under the condition” as used herein can be interpreted as “when,” “at the time of,” or “in response to determining.”

The examples of the disclosure are described in detail below, and the examples are illustratively shown in accompanying drawings, throughout which identical or similar reference numerals denote identical or similar elements. The examples described with reference to the accompanying drawings are illustrative and only intended to explain the disclosure, instead of being construed as limiting the disclosure.

The PDCP data reception entity can reorder received PDCP data packets according to serial numbers of the data packets, and submit the reordered PDCP data packets to a high-layer protocol entity in order according to the serial numbers. Further, a reordering window is updated according to the serial numbers of the PDCP data packets already submitted to the high-layer protocol entity. If the PDCP data reception entity receives a data packet outside the reordering window, the PDCP data reception entity will discard the data packet. Therefore, the PDCP data transmission entity needs to prevent transmitted data packets from falling outside a reception window of the PDCP data reception entity as far as possible.

In the related art, when a network side transmits data packets to a plurality of pieces of user equipment (UE) in a point-to-multipoint (PTM) mode, PDCP reception windows of all the pieces of UE can have different moving speeds because the amount of PDCP data packets received by the plurality of pieces of UE may be different. However, when the PDCP data transmission entity transmits the PDCP data packets at a fixed transmission rate, the serial number of the data packet transmitted is likely to fall outside the reception windows of the PDCP data reception entity of some pieces of UE, resulting in the loss of the data packets transmitted.

According to the examples of the disclosure, in order to solve the problem that in the related art, when a network side transmits data packets to a plurality of pieces of user equipment (UE) in a point-to-multipoint (PTM) mode, a packet data convergence protocol (PDCP) data transmission entity transmits PDCP data packets at a fixed transmission rate, but PDCP reception windows of the plurality of pieces of UE have different moving speeds, such that a serial number of the data packet transmitted is likely to fall outside the reception windows of a PDCP data reception entity of some pieces of UE, resulting in loss of the data packets transmitted, a method for transmitting data is provided.

According to the method for transmitting data provided in the example of the disclosure, on the basis of a specified strategy, a boundary value of a data reordering window is updated, where the specified strategy is any one of the following strategies: a first indication message and a preset rule obtained, and the first indication message is configured to indicate a boundary value to be updated of the reordering window to a data reception entity. In this way, the PDCP data reception entity updates the boundary value of the data reordering window according to the specified strategy of the PDCP data transmission entity, such that when the data packets are transmitted to the plurality of pieces of UE in the PTM mode, the data packets transmitted from the PDCP data transmission entity may fall within the data reordering window of the PDCP data reception entity of each piece of UE all the time, and further loss of the data packets received by PDCP is avoided.

A method and apparatus for transmitting data, a communication device, and a storage medium according to the disclosure will be described in detail below with reference to the accompanying drawings.

FIG. 1 is a schematic flow diagram of a method for transmitting data according to an example of the disclosure, which is applied to a PDCP data reception entity.

As shown in FIG. 1, the method for transmitting data includes the following steps:

Step 101, on the basis of a specified strategy, a boundary value of a data reordering window is updated, where the specified strategy is any one of the following strategies: a first indication message and a preset rule obtained, and the first indication message is configured to indicate a boundary value to be updated of the reordering window to the PDCP data reception entity.

It is to be noted that the PDCP data reception entity according to the example of the disclosure may be any terminal, and the method for transmitting data according to the example of the disclosure may be applied to any terminal. The terminal may refer to a device configured to provide voice and/or data connectivity for a user. The terminal may be in communication with one or more core networks via a radio access network (RAN). The terminal may be an Internet of Things terminal, such as a sensor device, a mobile telephone (also called a cellular telephone) or a computer having an Internet of Things terminal, and for instance, may be a fixed, portable, pocket, hand-held, built-in or vehicular apparatus. For instance, the terminal may be a station (STA), a subscriber unit, a subscriber station, a mobile station, a mobile, a remote station, an access point, a remote terminal, an access terminal, a user terminal, a user agent, a user device, or UE. Alternatively, the terminal may be a device of an unmanned aerial vehicle. Alternatively, the terminal may be a vehicular device, and for instance, may be a vehicle computer having a radio communication function, or a radio terminal externally connected to a vehicle computer. Alternatively, the terminal may be a roadside device, and for instance, may be a street lamp having a radio communication function, a signal lamp, or other roadside devices.

The data reordering window refers to a serial number range of serial numbers of PDCP data packets that may be reordered by the PDCP data reception entity. The boundary value of the data reordering window may include an upper boundary value and a lower boundary value. Specifically, the upper boundary value of the data reordering window may be half of a maximum serial number value of a PDCP serial number (SN), that is, Window_Size= $2^{[pdcp\text{-}SN\text{-}SizeDL]-1}$. Window_Size is a size of the reordering window, and pdcp-SN-SizeDL is the amount of bits of the PDCP SN. The lower boundary value of the data reordering window may identify a serial number value of a first PDCP data packet not submitted to a high-layer protocol entity, which may be represented by a variable "RX_DELIV".

In the example of the disclosure, when a network side transmits data packets to a plurality of PDCP data reception entities in a PTM mode, each PDCP data reception entity may update the boundary value of the data reordering window in a process of receiving the PDCP data packets according to the specified strategy. In this way, an updating speed of the data reordering window of each PDCP data reception entity may adapt to a transmission rate of transmitting the data packets from the PDCP data transmission entity, such that loss of the PDCP data packets is avoided.

As a possible embodiment, the PDCP data transmission entity may transmit the first indication message to the PDCP data reception entity, such that the PDCP data reception entity may update the boundary value of the data reordering window according to the first indication message. In this way, an updating condition of the data reordering window may adapt to a rate of transmitting the data packets from the PDCP data transmission entity, such that loss of the PDCP data packets is avoided.

As another possible embodiment, the preset rule may be configured by the network side or specified by a protocol, such that the PDCP data reception entity may update the boundary value of the data reordering window according to the preset rule. In this way, changes of the PDCP data packets transmitted from the PDCP data transmission entity may fall within the data reordering window all the time. That is, in a possible embodiment of the example of the disclosure, the specified strategy is the preset rule. In an example, the method for transmitting data may include:

according to a current service scheduling mode of the PDCP data reception entity, the boundary value of the data reordering window is updated.

In the example of the disclosure, the current service scheduling modes of the PDCP data reception entity may include three modes of a push window, a pull window, and a combination of a push window and a pull window. In the three service scheduling modes, the PDCP data reception entity may update the boundary value of the data reordering window in the following updating modes:

Case 1

In response to determining that the current service scheduling mode of the PDCP data reception entity is the push window, the lower boundary value of the reordering window may be updated according to a serial number of a PDCP data packet submitted to an upper layer.

Specifically, if the serial number of the PDCP data packet finally submitted by the PDCP data reception entity to the upper layer is X, the lower boundary value of the reordering window may be updated to X+1, and the upper boundary value of the reordering window may be kept to be a maximum value $2^{[pdcp\text{-}SN\text{-}SizeDL]-1}$, such that serial numbers of all PDCP data packets not submitted to the upper layer may fall within the reordering window. In this way, when the PDCP data transmission entity transmits the PDCP data packet at any rate, the PDCP data reception entity may obtain the PDCP data packets not submitted to the upper layer, and loss of the PDCP data packets is avoided.

Case 2

In response to determining that the current service scheduling mode of the PDCP data reception entity is the pull window, the upper boundary value of the reordering window may be updated according to a maximum serial number of the PDCP data packet received.

Specifically, if the maximum serial number of the PDCP data packet received by the PDCP data reception entity is Y, the upper boundary value of the current reordering window is a, and Y is greater than a, the upper boundary value of the reordering window may be updated to Y, and the lower boundary value of the reordering window may be a minimum serial number value of the PDCP data packet, such that serial numbers of all latest PDCP data packets received by the PDCP may fall within the reordering window. In this way, when the PDCP data transmission entity transmits the PDCP data packet at any rate, the PDCP data reception entity may successfully receive the PDCP data packets not received before, and loss of the PDCP data packets is avoided.

Case 3

In response to determining that the current service scheduling mode of the PDCP data reception entity is the combination of the push window and the pull window, the lower boundary value of the reordering window may be updated according to a serial number of a PDCP data packet submitted to a upper layer, and the upper boundary value of the reordering window may be updated according to a maximum serial number of the PDCP data packet received.

Specifically, if the serial number of the PDCP data packet finally submitted by the PDCP data reception entity to the upper layer is X, the maximum serial number of the PDCP data packet received by the PDCP data reception entity is Y, the upper boundary value of the current reordering window is a, and Y is greater than a, the lower boundary value of the reordering window may be updated to X+1, and the upper boundary value of the reordering window may be updated to Y, such that serial numbers of all PDCP data packets not submitted to the upper layer and serial numbers of PDCP data packets not received before may fall within the reordering window. In this way, when the PDCP data transmission entity transmits the PDCP data packet at any rate, the PDCP data reception entity may obtain the PDCP data packets not received before and not submitted to the upper layer, and loss of the PDCP data packets is avoided.

It is to be noted that in the example of the disclosure, the service scheduling mode of the PDCP data reception entity may be specified by configuration information of the network side or the protocol. Specifically, in response to determining that the service scheduling mode of the PDCP data reception entity is specified by the configuration information of the network side, the service scheduling mode of the PDCP data reception entity may be determined to be the service scheduling mode specified in the configuration information.

Accordingly, in response to determining that the service scheduling mode of the PDCP data reception entity is specified by the protocol, the current service scheduling mode of the PDCP data reception entity may be determined to be the push window in response to determining that the PDCP data reception entity receives data in a unicast mode (for instance, through a common unicast bearer or a unicast path of a split multicast broadcast service (MB S) bearer); and the current service scheduling mode of the PDCP data reception entity may be determined to be the pull window or the combination of the pull window and the push window in response to determining that the PDCP data reception entity receives data in a multicast mode (for instance, through a common MBS bearer or a multicast path of a split MBS bearer).

It is to be noted that all the examples of the disclosure may be executed independently or in combination with other examples.

According to the method for transmitting data provided in the example of the disclosure, on the basis of the specified strategy, the boundary value of the data reordering window is updated, where the specified strategy is any one of the following strategies: whether the first indication message and the preset rule is obtained, and the first indication message is configured to indicate the boundary value to be updated of the reordering window to the PDCP data reception entity. In this way, the PDCP data reception entity updates the boundary value of the data reordering window according to the specified strategy of the PDCP data transmission entity, such that when the data packets are transmitted to the plurality of pieces of UE in the PTM mode, the data packets transmitted from the PDCP data transmission entity may fall within the data reordering window of the PDCP data reception entity of each piece of UE all the time, and further loss of the data packets received by PDCP is avoided.

In a possible embodiment of the disclosure, the PDCP data reception entity may update the boundary value of the data reordering window according to the first indication message transmitted from the PDCP data transmission entity, such that the updating condition of the reordering window may be more in line with a real-time transmission condition of the PDCP data packets, and further the transmission rate and reliability of the PDCP data packets may be improved.

With reference to FIG. 2, another method for transmitting data according to an example of the disclosure, will be further described below.

FIG. 2 is a schematic flow diagram of another method for transmitting data according to an example of the disclosure, which is applied to a PDCP data reception entity.

As shown in FIG. 2, the method for transmitting data includes the following steps:

Step 201, in response to obtaining a first indication message, a boundary value of a data reordering window is updated according to the content of the first indication message.

The content of the first indication message may include at least one of the following information: a lower boundary value of the reordering window, the lower boundary value of the reordering window minus one, the lower boundary value of the reordering window plus one, an upper boundary value of the reordering window, the upper boundary value of the reordering window minus one, the upper boundary value of the reordering window plus one, indication information of an ignorable PDCP data packet corresponding to a reordering timer, the maximum amount of ignorable data packets not received, and a serial number of an ignorable data packet not received.

In the example of the disclosure, a PDCP data transmission entity may transmit the first indication message to each PDCP data reception entity according to a transmission rate of transmitting PDCP data packets to each PDCP data reception entity or a serial number of each PDCP data packet to be transmitted to each PDCP data reception entity, such that each PDCP data reception entity may update the boundary value of the data reordering window according to the content of the first indication message.

As a possible embodiment, in response to determining that the first indication message includes the boundary value of the reordering window, the PDCP data reception entity may update the boundary value of the reordering window according to the boundary value of the reordering window included in the first indication message. That is, in a possible embodiment of the example of the disclosure, the method for transmitting data may include:

on the basis of the boundary value N of the reordering window in the first indication message, the boundary value of the reordering window is adjusted to N+M, where M is a preset value, and alternatively, M is a value carried in the first indication message.

Specifically, in response to determining that the lower boundary value of the reordering window in the first indication message is N, the PDCP data reception entity may update the lower boundary value of the reordering window to N+M. Alternatively, in response to determining that the lower boundary value of the reordering window minus one in the first indication message is N, the PDCP data reception entity may update the lower boundary value of the reordering window to N+M. Alternatively, in response to determining that the lower boundary value of the reordering window plus one in the first indication message is N, the PDCP data reception entity may update the lower boundary value of the reordering window to N+M.

Accordingly, in response to determining that the upper boundary value of the reordering window in the first indication message is N, the PDCP data reception entity may update the upper boundary value of the reordering window to N+M. Alternatively, in response to determining that the upper boundary value of the reordering window minus one in the first indication message is N, the PDCP data reception entity may update the upper boundary value of the reordering window to N+M. Alternatively, in response to determining that the upper boundary value of the reordering window plus one in the first indication message is N, the PDCP data reception entity may update the upper boundary value of the reordering window to N+M.

It is to be noted that in practical use, a specific value of M may be specified by configuration information of a network side or a protocol. For instance, M may be −1, 0, or +1. Specifically, the specific value of M may be specified according to the content included in the first indication message transmitted from the PDCP data transmission entity. Alternatively, the PDCP data transmission entity may determine the content included in the first indication message according to a specified value of M.

Alternatively, in response to determining that the first indication message includes the lower boundary value of the reordering window or the upper boundary value of the reordering window, the value of M may be specified to be 0. Alternatively, in response to determining that the specified value of M is 0, the PDCP data transmission entity may determine that the first indication message may include the lower boundary value of the reordering window or the upper boundary value of the reordering window.

Alternatively, in response to determining that the first indication message includes the lower boundary value of the reordering window minus one or the upper boundary value of the reordering window minus one, the value of M may be specified to be +1. Alternatively, in response to determining that the specified value of M is +1, the PDCP data transmission entity may determine that the first indication message may include the lower boundary value of the reordering window minus one or the upper boundary value of the reordering window minus one.

Alternatively, in response to determining that the first indication message includes the lower boundary value of the reordering window plus one or the upper boundary value of the reordering window plus one, the value of M may be specified to be −1. Alternatively, in response to determining that the specified value of M is −1, the PDCP data transmission entity may determine that the first indication message may include the lower boundary value of the reordering window plus one or the upper boundary value of the reordering window plus one.

Further, the PDCP data reception entity may also update the boundary value of the reordering window according to the first indication message when the boundary value of the current reordering window is smaller than the boundary value of the reordering window included in the first indication message. That is, in a possible embodiment of the example of the disclosure, the method for transmitting data may include:

on the basis of the boundary value N of the reordering window in the first indication message, the boundary value of the reordering window is adjusted to N+M in response to determining that a current boundary value of the reordering window is smaller than N+M, where M is a preset value, and alternatively, M is a value carried in the first indication message.

Specifically, in response to determining that the lower boundary value of the reordering window in the first indication message is N and the lower boundary value of the current reordering window of the PDCP data reception entity is smaller than N+M, the PDCP data reception entity may update the lower boundary value of the reordering window to N+M. Alternatively, in response to determining that the lower boundary value of the reordering window minus one in the first indication message is N and the lower boundary value of the current reordering window of the PDCP data reception entity is smaller than N+M, the PDCP data reception entity may update the lower boundary value of the reordering window to N+M. Alternatively, in response to determining that the lower boundary value of the reordering window plus one in the first indication message is N and the lower boundary value of the current reordering window of the PDCP data reception entity is smaller than N+M, the PDCP data reception entity may update the lower boundary value of the reordering window to N+M.

Accordingly, in response to determining that the upper boundary value of the reordering window in the first indication message is N and the upper boundary value of the current reordering window of the PDCP data reception entity is smaller than N+M, the PDCP data reception entity may update the upper boundary value of the reordering window to N+M. Alternatively, in response to determining that the upper boundary value of the reordering window minus one in the first indication message is N and the upper boundary value of the current reordering window of the PDCP data reception entity is smaller than N+M, the PDCP data reception entity may update the upper boundary value of the reordering window to N+M. Alternatively, in response to determining that the upper boundary value of the reordering window plus one in the first indication message is N and the upper boundary value of the current reordering window of the PDCP data reception entity is smaller than N+M, the PDCP data reception entity may update the upper boundary value of the reordering window to N+M.

As another possible embodiment, the PDCP data reception entity may further determine whether the data packet not received may be ignored according to the boundary value of the current reordering window and the boundary value of the reordering window included in the first indication message, when the first indication message includes the indication information of the ignorable PDCP data packet corresponding to the reordering timer, the maximum amount of the ignorable data packets not received, and the serial number of the ignorable data packet not received. That is, in a possible embodiment of the example of the disclosure, the method for transmitting data may include:

in response to determining that the current boundary value of the data reordering window is smaller than or equal to the corresponding boundary value in the first indication message, the PDCP data packet not received and corresponding to the reordering timer is ignored;

alternatively, in response to determining that the current boundary value of the data reordering window is smaller than or equal to the corresponding boundary value in the first indication message, the amount of the ignorable data packets not received is determined according to the maximum amount of the ignorable data packets not received; and alternatively, in response to determining that the current boundary value of the data reordering window is smaller than or equal to the corresponding boundary value in the first indication message, the data packet not received and corresponding to the serial number of the ignorable data packet not received is ignored.

Alternatively, in response to determining that the first indication message includes the indication information of the ignorable PDCP data packet corresponding to the reordering timer, and the current lower boundary value of the data reordering window is smaller than or equal to the corresponding lower boundary value in the first indication message, and alternatively, the current upper boundary value of the data reordering window is smaller than or equal to the corresponding upper boundary value in the first indication message, the PDCP data reception entity may ignore the PDCP data packet not received and corresponding to the reordering timer.

Alternatively, in response to determining that the first indication message includes the maximum amount of the ignorable data packets not received, and the current lower boundary value of the data reordering window is smaller than or equal to the corresponding lower boundary value in the first indication message, and alternatively, the current upper boundary value of the data reordering window is smaller than or equal to the corresponding upper boundary value in the first indication message, the PDCP data reception entity may determine the amount of the ignorable PDCP data packets not received according to the maximum amount, included in the first indication message, of the ignorable data packets not received.

For instance, if the maximum amount, included in the first indication message, of the ignorable data packets not received is 4, and a serial number of a PDCP data packet to be received in a reception window of the PDCP data reception entity is 1/2/4/6/8, the PDCP data reception entity may determine that the amount of the ignorable data packets not received is 4, and ignore the PDCP data packet with the serial number of 1/2/4/6 in an ascending order of the serial numbers. For another instance, the amount of PDCP data packets to be received in the reception window of the PDCP data reception entity is 3, the PDCP reception entity may determine that the amount of the ignorable data packets not received is 3.

Alternatively, in response to determining that the first indication message includes the serial number of the ignorable data packet not received, and the current lower boundary value of the data reordering window is smaller than or equal to the corresponding lower boundary value in the first indication message, and alternatively, the current upper boundary value of the data reordering window is smaller than or equal to the corresponding upper boundary value in the first indication message, the PDCP data reception entity may ignore the data packet not received and corresponding to the serial number, included in the first indication message, of the ignorable data packet not received.

For instance, if the serial number, included in the first indication message, of the ignorable data packet not received is 3, the PDCP data reception entity may ignore the PDCP data packet with the serial number of 3 when the data packets received do not include the PDCP data packet with the serial number of 3.

It is to be noted that in response to determining that the first indication message does not include the lower boundary value of the reordering window, the lower boundary value of the reordering window may be implicitly represented by the lower boundary value of the reordering window minus one, the lower boundary value of the reordering window plus one, the upper boundary value of the reordering window, the upper boundary value of the reordering window minus one, and the upper boundary value of the reordering window plus one; and in response to determining that the first indication message does not include the upper boundary value of the reordering window, the upper boundary value of the reordering window may be implicitly represented by the lower boundary value of the reordering window, the lower boundary value of the reordering window minus one, the lower boundary value of the reordering window plus one, the upper boundary value of the reordering window minus one, and the upper boundary value of the reordering window plus one.

According to the method, the behaviour that the PDCP reception entity updates the boundary value of the reordering window further includes the step that the PDCP reception entity processes the stored PDCP data packets with the serial numbers smaller than or equal to a lower boundary of the reordering window in order and then submits the data packets to a high-layer protocol entity. For instance, the lower boundary value of the current reordering window of the PDCP reception entity is RX_DELIV=1, and the serial number of the PDCP data packet stored in the current reordering window is PDCP COUNT=2/3/5/7. If the PDCP reception entity adjusts the lower boundary value of the reordering window to RX_DELIV=4, the PDCP reception entity ignores reception of the data packet with PDCP COUNT=1, and processes the data packet with PDCP COUNT=2/3 and then submits the data packet to the high-layer protocol entity.

In the example of the disclosure, step 201 may be implemented through any one of the methods according to the examples of the disclosure, which are not limited in the example of the disclosure and will not be repeated herein.

According to the method for transmitting data provided in the example of the disclosure, in response to obtaining the first indication message, the boundary value of the data reordering window of the PDCP data reception entity is updated according to the content of the first indication message. In this way, the PDCP data reception entity updates the boundary value of the data reordering window according to the specified boundary information of the PDCP data transmission entity, such that when the data packets are transmitted to the plurality of pieces of UE in the PTM mode, the data packets transmitted from the PDCP data transmission entity may fall within the data reordering window of the PDCP data reception entity of each piece of UE all the time, and further, not only loss of the data packets received by PDCP is avoided, but the updated content of the data reordering window may be more in line with a real-time transmission state of the PDCP data packets. Further, the transmission rate and reliability of the PDCP data packets are improved.

The method for transmitting data according to the example of the disclosure is applied to a PDCP data reception entity and includes:

in response to obtaining no first indication message, the boundary value of the data reordering window is kept to be unchanged.

In some examples, whether the PDCP data reception entity needs to update the reordering window may be indicated by the indication message transmitted from the PDCP data transmission entity. Therefore, the PDCP data reception entity may determine whether the first indication message is obtained before updating the reordering window. In this way, whether the reordering window needs to be updated may be determined.

In the example, the first indication message may be configured to indicate that the PDCP data reception entity needs to update the data reordering window. In this case, in response to obtaining the first indication message, the PDCP data reception entity may update the boundary value of the data reordering window according to the content of the first indication message. Accordingly, in response to obtaining no first indication message, the PDCP data reception entity may determine that the data reordering window does not need to be updated currently, that is, may keep the boundary value of the data reordering window to be unchanged.

The method for transmitting data according to the example of the disclosure is applied to a PDCP data reception entity and includes:

in response to obtaining a third indication message, the boundary value of the data reordering window is kept to be unchanged; and alternatively, in response to obtaining no third indication message, the boundary value of the data reordering window is updated.

In some examples, whether the PDCP data reception entity needs to update the reordering window may be indicated by the indication message transmitted from the PDCP data transmission entity. Therefore, the PDCP data reception entity may determine whether the third indication message is obtained before updating the reordering window. In this way, whether the reordering window needs to be updated may be determined.

In the example, the third indication message may be configured to indicate that the PDCP data reception entity does not need to update the data reordering window. In this case, in response to obtaining the third indication message, the PDCP data reception entity may determine that the data reordering window does not need to be updated currently, that is, may keep the boundary value of the data reordering window to be unchanged. Accordingly, in response to receiving no third indication message, the PDCP data reception entity may update the boundary value of the data reordering window according to a pre-specified updating rule. For instance, the pre-specified updating rule may be to increase the lower boundary value of the data reordering window by a preset value, or to update the boundary value of the data reordering window according to the current service scheduling mode of the PDCP data reception entity. In practical use, the updating rule may be set according to practical service requirements, which is not limited in the example of the disclosure.

In a possible embodiment of the disclosure, the PDCP data reception entity may further trigger the PDCP data transmission entity to transmit the first indication message by transmitting current state information of the data reordering window to the PDCP data transmission entity. Further, transmission reliability of the PDCP data packets is improved.

With reference to FIG. 3, yet another method for transmitting data according to an example of the disclosure will be further described below.

FIG. 3 is a schematic flow diagram of yet another method for transmitting data according to an example of the disclosure, which is applied to a PDCP data reception entity.

As shown in FIG. 3, the method for transmitting data includes the following steps:

Step 301, current state information of a data reordering window is transmitted to a PDCP data transmission entity, where the PDCP data transmission entity generates a first indication message on the basis of the state information or determines a preset rule.

The current state information of the data reordering window may include at least one of the following information: a lower boundary value of the reordering window, the lower boundary value of the reordering window minus one, the lower boundary value of the reordering window plus one, an upper boundary value of the reordering window, the upper boundary value of the reordering window minus one, the upper boundary value of the reordering window plus one, a serial number of a next PDCP data packet to be received, and a serial number of a last received PDCP data packet in the reordering window.

For instance, in response to determining that a serial number of a first PDCP data packet not submitted to a upper layer is "RX_DELIV", the PDCP data reception entity may determine that the lower boundary value of the reordering window is "RX_DELIV", the lower boundary value of the reordering window minus one is "RX_DELIV−1", the lower boundary value of the reordering window plus one is "RX_DELIV+1", the upper boundary value of the reordering window is "RX_DELIV+(Window_Size−1)", the upper boundary value of the reordering window minus one is "RX_DELIV+(Window_Size−1)−1", and the upper boundary value of the reordering window plus one is "RX_DELIV+(Window_Size−1)+1". In response to determining that the serial number of the last received PDCP data packet in the reordering window of the current PDCP data reception entity is 3, the PDCP data reception entity may determine that the serial number of the last received PDCP data packet in the reordering window is 3 and the serial number "RX_NEXT" of the next PDCP data packet to be received is 4.

In the example of the disclosure, the PDCP data reception entity may transmit the current state information of the data reordering window to the PDCP data transmission entity through the following method:

the current state information of the data reordering window is transmitted to the data transmission entity by means of a PDCP control packet;

alternatively, the current state information of the data reordering window is transmitted to the data transmission entity by means of a PDCP data packet; and alternatively, the current state information of the data reordering window is transmitted to the data transmission entity by means of a radio resource control (RRC) message, where the RRC message includes identity information of the PDCP data reception entity.

It is to be noted that the identity information of the PDCP data reception entity may include at least one of the following information: a bearer identity, a logical channel identity, a cell group identity, a radio link control (RLC) entity identity, a multicast scheduling identity, and an MBS identity. The bearer identity may be DRB-1. The logical channel identity may be LCID-1. The cell group identity may be a master cell group (MCG) or secondary cell group (SCG) identity. The RLC entity identity may be RLC-1 corresponding to DRB-1. The multicast scheduling identity may be M-radio network temporary identity (RNTI)-1. The MBS identity may include a temporary mobile group identity (TMGI), an MBS session identity (ID), and an MBS quality of service (QoS) flow ID.

As an instance, in response to determining that the PDCP data reception entity is a split MBS bearer, the PDCP data reception entity may transmit the current state information of the data reordering window to the PDCP data transmission entity through point-to-point (PTP) scheduling. That is, the current state information of the data reordering window may be transmitted by means of an RLC entity corresponding to a unicast path.

Further, whether the PDCP data reception entity needs to transmit the current state information of the data reordering window to the PDCP data transmission entity currently may be indicated according to a specified event. That is, in a possible embodiment of the example of the disclosure, the step 301 may include:

in response to monitoring the specified event, the current state information of the data reordering window is transmitted to the data transmission entity; and alternatively, in response to monitoring no specified event, the current state information of the data reordering window is transmitted to the data transmission entity.

As an instance, it may be indicated that the PDCP data reception entity may transmit the current state information of the data reordering window to the PDCP data transmission entity by monitoring the specified event. In this way, in response to monitoring the specified event, the PDCP data reception entity may transmit the current state information of the data reordering window to the PDCP data transmission entity.

As an instance, it may be indicated that the PDCP data reception entity may transmit the current state information of the data reordering window to the PDCP data transmission entity by monitoring no specified event. In this way, in response to monitoring no specified event, the PDCP data reception entity may transmit the current state information of the data reordering window to the PDCP data transmission entity.

In the example of the disclosure, when the current state information of the data reordering window is transmitted to the PDCP data transmission entity in response to monitoring the specified event, the specified event may be at least one of the following events: a second indication message transmitted from the PDCP data transmission entity is received, the specified update time is reached, the amount of data packets in the reordering window is greater than or equal to a first threshold, a reordering timer runs out of time, and the amount of times of time-out of the reordering timer is greater than or equal to a second threshold.

The second indication message is configured to instruct the PDCP data reception entity to transmit the current state information of the reordering window.

Alternatively, the PDCP data reception entity may be triggered to transmit the current state information of the data reordering window to the PDCP data transmission entity by enabling the PDCP data transmission entity to transmit the second indication message to the PDCP data reception entity. The PDCP data transmission entity may transmit the second indication message to the PDCP data reception entity by means of the RRC message or the PDCP data packet. Specifically, in response to determining that the second indication message is the RRC message, the second indication message may include at least one of the following information: the identity information of the PDCP data reception entity, and indication information configured to indicate whether the PDCP data reception entity transmits the state information of the reordering window. In response to determining that the second indication message is the PDCP data packet, the second indication message may be transmitted by the PDCP data transmission entity corresponding to the PDCP data reception entity.

It is to be noted that the identity information of the PDCP data reception entity in the example is the same as the identity information of the PDCP data reception entity in the above-mentioned example, which is not repeated herein.

Alternatively, the PDCP data reception entity may further transmit the current state information of the data reordering window to the PDCP data transmission entity in a specified period. In this way, the PDCP data reception entity may determine each point of specified update time according to the specified period, and determine that specified time is monitored in response to determining that each point of specified update time is reached. Further, the current state information of the data reordering window is transmitted to the PDCP data transmission entity.

It is to be noted that the specified period may be specified by configuration information of a network side or a protocol. For instance, the specified period may be 10 ms.

Alternatively, the PDCP data reception entity may further determine whether to transmit the current state information of the data reordering window to the PDCP data transmission entity according to the amount of PDCP data packets cached in the PDCP data reception entity and not submitted to an upper layer. Specifically, in response to determining that the amount of the data packets in the reordering window is greater than or equal to the first threshold, that is, the amount of the PDCP data packets cached in the PDCP data reception entity and not submitted to an upper layer is greater than the first threshold, the PDCP data reception entity may determine that the specified event is monitored and may be triggered to transmit the current state information of the data reordering window to the PDCP data transmission entity. For instance, the first threshold may be 20.

Alternatively, when the PDCP data reception entity is waiting to receive the PDCP data packet, the reordering timer corresponding to the serial number of the PDCP data packet waiting to be received may be started, and the serial number of the corresponding PDCP data packet may be ignored when the reordering timer runs out of time. Therefore, in order to avoid loss of the PDCP packets, time-out of the reordering timer may be regarded as the specified event, such that the PDCP data reception entity may transmit the current state information of the data reordering window to the PDCP data transmission entity in response to determining that the reordering timer runs out of time. Further, a PDCP data transmission end may generate the first indication message and transmit the first indication message to the PDCP data reception entity according to the current state information of the data reordering window and a current data packet transmission condition of the PDCP data transmission end, so as to avoid loss of the PDCP data packets.

Alternatively, the amount of times of time-out of the reordering timer may be regarded as the specified event, such that the PDCP data reception entity may transmit the current state information of the data reordering window to the PDCP data transmission entity in response to determining that the amount of times of time-out of the reordering timer is greater than or equal to the second threshold, so as to avoid loss of the PDCP data packets. For instance, the second threshold may be 3.

Further, in response to the specified event that the amount of times of time-out of the reordering timer is greater than or equal to the second threshold, in a possible embodiment of the example of the disclosure, the method for transmitting data may further include:

in response to the event that the reordering timer runs out of time, a time-out counter of the reordering timer is increased by one;

and/or, in response to an event that the reordering timer is stopped, a time-out counter of the reordering timer is reset.

In the example of the disclosure, in response to the specified event that the amount of times of time-out of the reordering timer is greater than or equal to the second threshold, the PDCP data reception entity may count the amount of times of time-out of the reordering timer by increasing the time-out counter of the reordering timer by one when determining that the reordering timer runs out of time and the amount of times of time-out of the reordering timer is smaller than the second threshold. In addition, in response to determining that the reordering timer is stopped, it may be determined that the PDCP receives the PDCP data packet corresponding to the reordering timer. Therefore, the amount of times of time-out of the reordering timer does not need to be counted successively, and further, the PDCP data reception entity may reset the time-out counter of the reordering timer (for instance, restore the time-out counter to an initial value of 0), so as to re-count the amount of times of time-out of the reordering timer.

Step 302, on the basis of a specified strategy, a boundary value of the data reordering window is updated, where the specified strategy is any one of the following strategies: the first indication message and the preset rule obtained, and the first indication message is configured to indicate a boundary value to be updated of the reordering window to the PDCP data reception entity.

In the example of the disclosure, in response to the current state information of the data reordering window transmitted from the PDCP data reception entity, the PDCP data transmission entity may generate the first indication message and transmit the first indication message to the PDCP data reception entity according to the current state information of the data reordering window and the current data packet transmission condition of the PDCP data transmission end, so as to instruct the PDCP data reception entity to update the boundary value of the data reordering window, and further avoid loss of the PDCP data packets.

In the example of the disclosure, step 302 may be implemented through any one of the methods according to the examples of the disclosure, which are not limited to the example of the disclosure and will not be repeated herein.

According to the method for transmitting data provided in the example of the disclosure, the current state information of the data reordering window is transmitted to the PDCP data transmission entity, and on the basis of the specified strategy, the boundary value of the data reordering window is updated, where the specified strategy is any one of the following strategies: the first indication message and the preset rule obtained, and the first indication message is configured to indicate the boundary value to be updated of the reordering window to the PDCP data reception entity. In this way, the PDCP data reception entity triggers the PDCP data transmission entity to generate the first indication message according to the current state information of the data reordering window and the current PDCP data packet transmission condition by transmitting the current state information of the data reordering window to the PDCP data transmission entity. Further, the reordering window is updated by comprehensively considering a real-time transmission state of the PDCP data packets and real-time state information of the reordering window of the PDCP data reception entity, and a transmission rate and reliability of the PDCP data packets are further improved.

FIG. 4 is a schematic flow diagram of yet another method for transmitting data according to an example of the disclosure, which is applied to a PDCP data transmission entity, for instance, a base station.

As shown in FIG. 4, the method for transmitting data includes the following steps:

Step 401, a first indication message configured to instruct a PDCP data reception entity to update a data reordering window is transmitted to the PDCP data reception entity, where the first indication message is configured to indicate a boundary value to be updated of the reordering window to the PDCP data reception entity.

It is to be noted that the PDCP data reception entity according to the example of the disclosure may be any terminal, and the method for transmitting data according to the example of the disclosure may be applied to any terminal. The terminal may refer to a device configured to provide voice and/or data connectivity for a user. The terminal may be in communication with one or more core networks via a RAN. The terminal may be an Internet of Things terminal, such as a sensor device, a mobile telephone (also called a cellular telephone) or a computer having an Internet of Things terminal, and for instance, may be a fixed, portable, pocket, hand-held, built-in or vehicular apparatus. For instance, the terminal may be a STA, a subscriber unit, a subscriber station, a mobile station, a mobile, a remote station, an access point, a remote terminal, an access terminal, a user terminal, a user agent, a user device, or UE. Alternatively, the terminal may be a device of an unmanned aerial vehicle. Alternatively, the terminal may be a vehicular device, and for instance, may be a vehicle computer having a radio communication function, or a radio terminal externally connected to a vehicle computer. Alternatively, the terminal may be a roadside device, and for instance, may be a street lamp having a radio communication function, a signal lamp, or other roadside devices.

The data reordering window refers to a serial number range of serial numbers of PDCP data packets that may be reordered by the PDCP data reception entity. The boundary value of the data reordering window may include an upper boundary value and a lower boundary value. Specifically, the upper boundary value of the data reordering window may be half of a maximum serial number value of a PDCP SN, that is, Window_Size=$2^{[pdcp\text{-}SN\text{-}SizeDL]\text{-}1}$. Window_Size is a size of the reordering window, and pdcp-SN-SizeDL is the amount of bits of the PDCP SN. The lower boundary value of the data reordering window may identify a serial number value of a first PDCP data packet not submitted to a high-layer protocol entity, which may be represented by a variable "RX_DELIV".

The content of the first indication message may include at least one of the following information: the lower boundary value of the reordering window, the lower boundary value of the reordering window minus one, the lower boundary value of the reordering window plus one, the upper boundary value of the reordering window, the upper boundary value of the reordering window minus one, the upper boundary value of the reordering window plus one, indication information of an ignorable PDCP data packet corresponding to a reordering timer, the maximum amount of ignorable data packets not received, and a serial number of an ignorable data packet not received.

In the example of the disclosure, when a network side transmits data packets to a plurality of PDCP data reception entities in a PTM mode, the PDCP data transmission entity may transmit the first indication information to each PDCP data reception entity according to a transmission rate of transmitting PDCP data packets to each PDCP data reception entity or a serial number of each PDCP data packet to be transmitted to each PDCP data reception entity. Further, each PDCP data reception entity is instructed to update the boundary value of the data reordering window in a process of receiving the PDCP data packets according to the content of the first indication message. In this way, an updating speed of the data reordering window of each PDCP data reception entity may adapt to a transmission rate of transmitting the data packets from the PDCP data transmission entity, such that loss of the PDCP data packets is avoided.

As a possible embodiment, the PDCP data transmission entity may transmit the first indication message to the PDCP data reception entity on the basis of a preset rule. For instance, the preset rule may be to generate the first indication message and transmit the first indication message to each PDCP data reception terminal according to a preset rule specified by configuration information of the network side or a protocol before the PDCP data packet is transmitted to the PDCP data reception entity for the first time. For another instance, the PDCP data transmission terminal may generate the first indication message and transmit the first indication message to each PDCP data reception terminal according to the preset rule specified by the configuration information of the network side or the protocol, or the serial number of each PDCP data packet to be transmitted to each PDCP data reception entity before each time the PDCP data packet is transmitted to each PDCP data reception terminal.

According to the method for transmitting data provided in the example of the disclosure, the PDCP data transmission entity transmits the first indication message, configured to instruct the PDCP data reception entity to update the data reordering window, to the PDCP data reception entity, such that the PDCP data reception entity updates the data reordering window according to the first indication message. In this way, the PDCP data reception entity updates the boundary value of the data reordering window according to the specified first indication message of the PDCP data transmission entity, such that when the data packets are transmitted to the plurality of pieces of UE in the PTM mode, the data packets transmitted from the PDCP data transmission entity may fall within the data reordering window of the PDCP data reception entity of each piece of UE all the time, and further loss of the data packets received by PDCP is avoided.

In a possible embodiment of the disclosure, the PDCP data reception entity may further trigger the PDCP data transmission entity to transmit the first indication message by transmitting current state information of the data reordering window to the PDCP data transmission entity. Further, transmission reliability of the PDCP data packets is improved.

With reference to FIG. 5, still another method for transmitting data according to an example of the disclosure will be further described below.

FIG. 5 is a schematic flow diagram of still another method for transmitting data according to an example of the disclosure, which is applied to a PDCP data transmission entity, for instance, a base station.

As shown in FIG. 5, the method for transmitting data includes the following steps:

Step 501: in response to obtaining current state information of a data reordering window transmitted from a PDCP data reception entity, a first indication message is transmitted to the PDCP data reception entity, where the PDCP data transmission entity generates the first indication message on the basis of the state information.

In some examples, the state information is used to generate the first message or determine the preset rule by the data transmission entity.

The current state information of the data reordering window may include at least one of the following information: a lower boundary value of the reordering window, the lower boundary value of the reordering window minus one, the lower boundary value of the reordering window plus one, an upper boundary value of the reordering window, the upper boundary value of the reordering window minus one, the upper boundary value of the reordering window plus one, a serial number of a next PDCP data packet to be received, and a serial number of a last received PDCP data packet in the reordering window.

For instance, in response to determining that a serial number of a first PDCP data packet not submitted to a upper layer is "RX_DELIV", the PDCP data reception entity may determine that the lower boundary value of the reordering window is "RX_DELIV", the lower boundary value of the reordering window minus one is "RX_DELIV−1", the lower boundary value of the reordering window plus one is "RX_DELIV+1", the upper boundary value of the reordering window is "RX_DELIV+(Window_Size−1)", the upper boundary value of the reordering window minus one is "RX_DELIV+(Window_Size−1)−1", and the upper boundary value of the reordering window plus one is "RX_DELIV+(Window_Size−1)+1". In response to determining that the serial number of the last received PDCP data packet in the reordering window of the current PDCP data reception entity is 3, the PDCP data reception entity may determine that the serial number of the last received PDCP data packet in the reordering window is 3 and the serial number "RX_NEXT" of the next PDCP data packet to be received is 4.

In the example of the disclosure, the PDCP data transmission entity may obtain the current state information of the data reordering window transmitted from the PDCP data reception entity through the following method:

the current state information of the data reordering window transmitted from the PDCP data reception entity is obtained by means of a PDCP control packet;

alternatively, the current state information of the data reordering window transmitted from the PDCP data reception entity is obtained by means of a PDCP data packet; and alternatively, the current state information of the data reordering window transmitted from the PDCP data reception entity is obtained by means of a RRC message, where the RRC message includes identity information of the PDCP data reception entity.

It is to be noted that the identity information of the PDCP data reception entity may include at least one of the following information: a bearer identity, a logical channel identity, a cell group identity, a RLC entity identity, a multicast scheduling identity, and a MBS identity. The bearer identity may be DRB-1. The logical channel identity may be LCID-1. The cell group identity may be a MCG or SCG identity. The RLC entity identity may be RLC-1 corresponding to DRB-1. The multicast scheduling identity may be M-RNTI-1. The MBS identity may include a TMGI, a MBS session identity, and a MBS quality of service flow identity.

As an instance, in response to determining that the PDCP data reception entity is a split MBS bearer, the PDCP data reception entity may transmit the current state information of the data reordering window to the PDCP data transmission entity through PTP scheduling. In this way, in response to determining that the PDCP data reception entity is the split MBS bearer, the PDCP data transmission entity may obtain the current state information of the data reordering window transmitted from the PDCP data reception entity through PTP scheduling, that is, may obtain the current state information of the data reordering window by means of a RLC entity corresponding to a unicast path.

Further, the PDCP data reception entity may be instructed to transmit the current state information of the data reordering window to the PDCP data transmission entity by enabling the PDCP data transmission entity to transmit a second indication message to the PDCP as required. That is, in a possible embodiment of the example of the disclosure, the method for transmitting data may further include:

the second indication message is transmitted to the PDCP data reception entity, where the second indication message is configured to instruct the PDCP data reception entity to transmit the current state information of the data reordering window.

As a possible embodiment, the PDCP data transmission entity may transmit the second indication message to the PDCP data reception entity when the current status information of the data reordering window of the PDCP data reception entity needs to be obtained. Further, the PDCP data reception entity may be triggered to transmit the current state information of the data reordering window to the PDCP data transmission entity.

Alternatively, the PDCP data transmission entity may transmit the second indication message to the PDCP data reception entity by means of the PDCP data packet or the PDCP control packet. In addition, in response to determining whether the second indication message is the PDCP data packet or the PDCP control packet, the second indication message may be transmitted by the PDCP data transmission entity corresponding to the PDCP data reception entity.

Alternatively, the PDCP data transmission entity may transmit the second indication message to the PDCP data reception entity by means of the RRC message. Specifically, in response to determining that the second indication message is the RRC message, the second indication message may include at least one of the following information: the identity information of the PDCP data reception entity, and indication information configured to indicate whether the PDCP data reception entity transmits the state information of the reordering window.

It is to be noted that the identity information of the PDCP data reception entity in the example is the same as the identity information of the PDCP data reception entity in the above-mentioned example, which is not repeated herein.

In the example of the disclosure, in response to the current state information of the data reordering window transmitted from the PDCP data reception entity, the PDCP data transmission entity may generate the first indication message and transmit the first indication message to the PDCP data reception entity according to the current state information of the data reordering window and the current data packet transmission condition of the PDCP data transmission end, so as to instruct the PDCP data reception entity to update the boundary value of the data reordering window, and further avoid loss of the PDCP data packets.

According to the method for transmitting data provided in the example of the disclosure, in response to obtaining the current state information of the data reordering window transmitted from the PDCP data reception entity, the first indication message is transmitted to the PDCP data reception entity, such that the PDCP data reception entity updates the data reordering window according to the first indication message. In this way, the PDCP data reception entity triggers the PDCP data transmission entity to generate the first indication message according to the current state information of the data reordering window and the current PDCP data packet transmission condition by transmitting the current state information of the data reordering window to the PDCP data transmission entity. Further, the reordering window is updated by comprehensively considering a real-time transmission state of the PDCP data packets and real-time state information of the reordering window of the PDCP data reception entity, and a transmission rate and reliability of the PDCP data packets are further improved.

In the example of the disclosure, the data reordering window of the PDCP data reception entity may be updated through the two following methods:

Method 1

Step 1: the PDCP data reception entity notifies the state information of the data reordering window to the PDCP data transmission entity according to a trigger event.

Step 2: according to the step 1, or spontaneously, the PDCP data transmission entity (for instance, a network side) transmits the first indication message (for instance, information of the reordering window that needs to be moved) to the PDCP data reception entity (for instance, UE), and the PDCP data reception entity changes a variable value of the data reordering window according to the indication message.

Method 2

A PDCP reordering working method includes:

Working mode 1 (push window): a lower boundary of the reordering window is updated according to a serial number of the PDCP data packet submitted to an upper layer.

Working mode 2 (pull window): an upper boundary of the reordering window is updated according to a serial number of the PDCP data packet received.

Working mode 3 (push window+pull window): a lower boundary of the reordering window is updated according to a serial number of the PDCP data packet submitted to an upper layer, and an upper boundary of the reordering window is updated according to a serial number of the last received PDCP data packet (or a maximum value of a serial number of the PDCP data packet received).

The network side configures different PDCP reordering working modes for different bearer types. The PDCP data reception entity reorders the received PDCP data packets according to the PDCP reordering working mode indicated by the network side.

The method 1 will be described in detail below:

Step 1 (as shown in step 1 in FIG. 6): the PDCP data reception entity notifies the state information of the data reordering window to the PDCP data transmission entity according to any one of the following events:

Event 1: the second indication message of the PDCP data transmission entity is received (for instance, the network side instruct the PDCP data reception entity by means of the RRC message or the PDCP packet).

Event 2: reporting is conducted periodically (for instance, the network side configures or the protocol specifies that reporting is conducted every 10 ms).

Event 3: a data size of data packets in the reordering window is greater than or equal to a threshold (for instance, if the amount, configured by the network side or specified by the protocol, of reordered data packets in the reordering window of the PDCP data reception entity (that is, the data packets cached in the PDCP data reception entity and not submitted to the upper layer) is greater than or equal to 20, reporting is triggered).

Event 4: a reordering timer of the PDCP data reception entity runs out of time.

Event 5: the amount of times of successive time-out of the reordering timer of the PDCP data reception entity is greater than or equal to a threshold (for instance, if the amount, configured by the network side or specified by the protocol, of times of successive time-out of the reordering timer of the PDCP data reception entity is greater than or equal to 3, reporting is triggered).

The above events are configured by the network side or specified by the protocol.

For the event 1, when the PDCP data transmission entity instructs the PDCP data reception entity to transmit the state information of the reordering window by means of a PDCP packet (for instance, a PDCP data packet or a PDCP control packet), the PDCP packet is transmitted by the PDCP data transmission entity corresponding to the PDCP data reception entity.

For the event 1, when the PDCP data transmission entity instructs the PDCP data reception entity to transmit the state information of the reordering window by means of a RRC message, the RRC message includes at least one of the identity information of the PDCP data reception entity and the second indication message indicating whether to transmit the state information of the reordering window.

The "identity information of the PDCP data reception entity" includes at least one of a bearer identity (for instance, DRB-1), a logical channel identity (for instance, LCID-1), a cell group identity (for instance, MCG or SCG), a RLC entity identity (for instance, RLC-1 corresponding to DRB-1), a multicast scheduling identity (for instance, M-RNTI-1), and a MBS identity.

For the event 5, counting behaviours of the "successive time-out counter of the reordering timer" include at least one of the following behaviours:

- when the reordering timer runs out of time, the "successive time-out counter of the reordering timer" is increased by 1; and
- when the running reordering timer is stopped, the "successive time-out counter of the reordering timer" is reset (for instance, restored to an initial value (for instance, "0")).

A content of the "state information of the reordering window" includes at least one of the following information:

- a lower boundary serial number of the reordering window (for instance, a serial number "RX_DELIV" of a first PDCP data packet not submitted to a high-layer protocol entity);
- the lower boundary serial number of the reordering window minus one (for instance, a serial number minus one "RX_DELIV−1" of a first PDCP data packet not submitted to a high-layer protocol entity);
- the lower boundary serial number of the reordering window plus one (for instance, a serial number plus one "RX_DELIV+1" of a first PDCP data packet not submitted to a high-layer protocol entity);
- an upper boundary serial number of the reordering window (for instance, "RX_DELIV+(Window_Size−1)");
- the upper boundary serial number of the reordering window minus one (for instance, "RX_DELIV+(Window_Size−1)−1");
- the upper boundary serial number of the reordering window plus one (for instance, "RX_DELIV+(Window_Size−1)+1");
- a serial number of a PDCP data packet to be received (for instance, "RX_NEXT"), where if a serial number of a last received PDCP data packet in the current reordering window is COUNT=3, "RX_NEXT=4"; and
- a serial number of a last received data packet in the reordering window.

Transmission methods of the "state information of the reordering window" include any one of transmission by means of the PDCP control packet, transmission by means of the PDCP data packet, or transmission by means of the RRC message.

When the bearer is the "split MBS bearer", a transmission path of the "state information of the reordering window" may be further defined as the unicast path of the "split MBS bearer" (which is transmitted by means of an RLC entity corresponding to the unicast path, for instance).

When the transmission method of the "state information of the reordering window" is "transmission by means of the RRC message", the PDCP data reception entity additionally transmits "identity information of the PDCP data reception entity" (the "identity information of the PDCP reception entity" is the same as above).

Step 2 (as shown in step 2 in FIG. 6): according the "state information of the reordering window" in the step 1, or spontaneously, the PDCP data transmission entity transmits "update information of the reordering window (that is, the first indication message)" to the PDCP data reception entity.

A content of the "update information of the reordering window" includes at least one of the following information:

- information 1: a lower boundary serial number of the reordering window (for instance, a serial number "RX_DELIV" of a first PDCP data packet not submitted to a high-layer protocol entity);
- information 2: the lower boundary serial number of the reordering window minus one (for instance, a serial number minus one "RX_DELIV−1" of a first PDCP data packet not submitted to a high-layer protocol entity);
- information 3: the lower boundary serial number of the reordering window plus one (for instance, a serial number plus one "RX_DELIV+1" of a first PDCP data packet not submitted to a high-layer protocol entity);
- information 4: an upper boundary serial number of the reordering window (for instance, "RX_DELIV+(Window_Size−1)");
- information 5: the upper boundary serial number of the reordering window minus one (for instance, "RX_DELIV+(Window_Size−1)−1");
- information 6: the upper boundary serial number of the reordering window plus one (for instance, "RX_DELIV+(Window_Size−1)+1");
- information 7: indication information of an ignorable PDCP data packet corresponding to the reordering timer;
- information 8: the maximum amount of ignorable data packets not received (for instance, the network indicates that the maximum amount of data packets, not received, ignorable by UE is 4); and
- information 9: a serial number of an ignorable data packet not received (for instance, the network instructs the UE to ignore the data packet with PDCP COUNT=3).

Step 3 (as shown in step 3 in FIG. 6): according the "update information of the reordering window" received in the step 2, behaviours of updating the reordering window by the PDCP data reception entity include any one of the following behaviours:

Behaviour 1: the serial number of the PDCP data packet corresponding to the reordering timer is ignored.

Behaviour 2: according to the information 8, the PDCP data reception entity ignores the PDCP data packets not received, and the amount of the ignored PDCP data packets is smaller than or equal to the amount indicated in the information 8. (For instance, the network indicates that the maximum amount of PDCP data packets, not received, ignorable by UE is 4. When the serial number of PDCP packets to be received in the reordering window of the UE is 5 (for instance, the serial number of PDCP data packet to be received is COUNT=1/2/4/6/8), the UE ignores reception of 4 PDCP data packets (for instance, the serial number of the ignored PDCP data packet is COUNT=1/2/4/6 (for instance, the data packets are ignored in an ascending order according to the serial numbers of the PDCP data packets)). When the amount of the PDCP data packets to be received in the reordering window of the UE is 3, the UE ignores reception of 3 PDCP data packets.)

Behaviour 3: according to the information 9, the PDCP data reception entity ignores the PDCP data packet not received, and the serial number of the ignored PDCP data packet is indicated by the information 9. (For instance, the network instructs the UE to ignore the data packet with PDCP COUNT=3. When the PDCP data packets received by the UE do not include the data packet with PDCP COUNT=3, the UE ignores reception the data packet with PDCP COUNT=3.)

Behaviour 4: the PDCP data reception entity adjusts the lower boundary serial number of the reordering window to the "lower boundary serial number of the reordering window"+n" indicated by the "update information of the reordering window".

Behaviour 5: the PDCP data reception entity adjusts the upper boundary serial number of the reordering window to the "upper boundary serial number of the reordering window"+n" indicated by the "update information of the reordering window."

The "n" in the behaviour 4 or behaviour 5 is an integer configured by the network or specified by the protocol (for instance, "−1" or "0" or "+1").

It may be further defined that the behaviour 1 (or behaviour 2 or behaviour 3) may be executed only by satisfying any one of the following conditions:

Condition 1: the "lower boundary serial number of the reordering window" of the PDCP data reception entity is smaller than or equal to the "lower boundary serial number of the reordering window" indicated by the "update information of the reordering window".

Condition 2: the "upper boundary serial number of the reordering window" of the PDCP data reception entity is smaller than or equal to the "upper boundary serial number of the reordering window" indicated by the "update information of the reordering window".

The "lower boundary serial number of the reordering window" indicated by the "update information of the reordering window" may be indicated implicitly by the information 2/3/4/5/6 or displayed and indicated by the information 1.

The "upper boundary serial number of the reordering window" indicated by the "update information of the reordering window" may be indicated implicitly by the information 1/2/3/5/6 or displayed and indicated by the information 4.

The method 2 will be described in detail below:

Step 1: the network side configures or the protocol specifies that the working mode of the PDCP data reception entity is any one of the following working modes:

Working mode 1 (push window): a lower boundary of the reordering window is updated according to a serial number of the PDCP data packet submitted to an upper layer. (For instance, if a serial number of a last PDCP data packet submitted to the upper layer is COUNT=x, the updated lower boundary of the reordering window is x+1 (that is, a next packet waiting to be submitted to the upper layer)).

Working mode 2 (pull window): an upper boundary of the reordering window is updated according to a serial number of the last received PDCP data packet (or a maximum value of a serial number of the PDCP data packet received). (For instance, if the upper boundary of the current reordering window is COUNT=x, and the serial number of the last received PDCP data packet (or the maximum value of the serial number of the PDCP data packet received) is COUNT=y (y is greater than x), the upper boundary of the reordering window is updated to y.)

Working mode 3 (push window+pull window): a lower boundary of the reordering window is updated according to a serial number of the PDCP data packet submitted to a upper layer, and an upper boundary of the reordering window is updated according to a serial number of the last received PDCP data packet (or a maximum value of a serial number of the PDCP data packet received).

In the method that the protocol specifies the working mode of the PDCP data reception entity, the rules specified by the protocol include any one of the following rules:

When the PDCP data reception entity of the bearer receives data in a multicast mode (for instance, a common MBS bearer or a multicast path of a split MBS bearer), the PDCP data reception entity uses the working mode 2 or working mode 3.

When the PDCP data reception entity of the bearer receives data in a unicast mode (for instance, a common unicast bearer or a unicast path of a split MBS bearer), the PDCP data reception entity uses the working mode 1.

Step 2: according to the configuration information in the step 1, the reordering window of the PDCP data reception entity reorders the received PDCP data packets by using the corresponding working mode.

In order to implement the above examples, the disclosure further provides an apparatus for transmitting data.

Figures 7, 8:
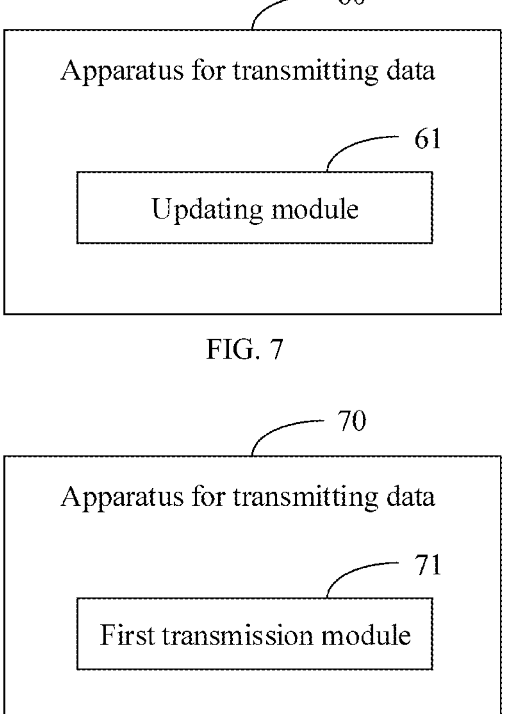
FIG. 7 is a schematic structural diagram of another apparatus for transmitting data according to an example of the disclosure.
FIG. 8 is a block diagram of user equipment according to an example of the disclosure.

FIG. 7 is a schematic structural diagram of an apparatus for transmitting data according to an example of the disclosure, which is applied to a PDCP data reception entity.

As shown in FIG. 7, the apparatus 60 for transmitting data includes:

- an updating module 61 configured to update, on the basis of a specified strategy, a boundary value of a data reordering window, where
- the specified strategy is any one of the following strategies: whether a first indication message and a preset rule are obtained.

In practical use, the apparatus for transmitting data according to the example of the disclosure may be configured in any communication device, so as to execute the above-mentioned method for transmitting data.

According to the apparatus for transmitting data provided in the example of the disclosure, on the basis of the specified strategy, the boundary value of the data reordering window is updated, where the specified strategy is any one of the following strategies: the first indication message and the preset rule obtained, and the first indication message is configured to indicate the boundary value to be updated of the reordering window to the PDCP data reception entity. In this way, the PDCP data reception entity updates the boundary value of the data reordering window according to the specified strategy of the PDCP data transmission entity, such that when data packets are transmitted to a plurality of pieces of UE in a PTM mode, the data packets transmitted from the PDCP data transmission entity may fall within the data reordering window of the PDCP data reception entity of each piece of UE all the time, and further loss of the data packets received by PDCP is avoided.

In a possible embodiment of the disclosure, the apparatus 60 for transmitting data further includes:

- a second transmission module configured to transmit current information of the data reordering window to the data transmission entity, where the data transmission entity generates the first indication message on the basis of state information or determines the preset rule.

Further, in another possible embodiment of the disclosure, the current state information of the data reordering window includes at least one of the following information: a lower boundary value of the reordering window, the lower boundary value of the reordering window minus one, the lower boundary value of the reordering window plus one, an upper boundary value of the reordering window, the upper boundary value of the reordering window minus one, the upper boundary value of the reordering window plus one, a serial number of a next PDCP data packet to be received, and a serial number of a last received PDCP data packet in the reordering window.

Further, in yet another possible embodiment of the disclosure, the second transmission module includes:

- a first transmission unit configured to transmit the current state information of the data reordering window to the data transmission entity by means of a PDCP control packet;

alternatively,

- a second transmission unit configured to transmit the current state information of the data reordering window to the data transmission entity by means of a PDCP data packet; and alternatively,

- a third transmission unit configured to transmit the current state information of the data reordering window to the data transmission entity by means of a radio resource control (RRC) message, where the RRC message includes identity information of the PDCP data reception entity.

Further, in yet another possible embodiment of the disclosure, the identity information of the PDCP data reception entity includes at least one of the following information: a bearer identity, a logical channel identity, a cell group identity, a RLC entity identity, a multicast scheduling identity, and a MBS identity.

Further, in yet another possible embodiment of the disclosure, the second transmission module includes:

- a fourth transmission unit configured to transmit, in response to determining that the PDCP data reception entity is a split MBS bearer, the current state information of the data reordering window to the data transmission entity through PTP scheduling.

Further, in yet another possible embodiment of the disclosure, the second transmission module includes:

- a fifth transmission unit configured to transmit, in response to monitoring a specified event, the current state information of the data reordering window to the data transmission entity; and alternatively,

- a sixth transmission unit configured to transmit, in response to monitoring no specified event, the current state information of the data reordering window to the data transmission entity.

Further, in yet another possible embodiment of the disclosure, the specified event is at least one of the following events: a second indication message transmitted from the data transmission entity is received, specified update time is reached, the amount of data packets in the reordering window is greater than or equal to a first threshold, a reordering timer runs out of time, and the amount of times of time-out of the reordering timer is greater than or equal to a second threshold.

The second indication message is configured to instruct the data reception entity to transmit the current state information of the reordering window.

Further, in yet another possible embodiment of the disclosure, the second indication message is the RRC message, and the second indication message includes at least one of the following information: the identity information of the PDCP data reception entity, and indication information configured to indicate whether the PDCP data reception entity transmits the state information of the reordering window.

Further, in yet another possible embodiment of the disclosure, the specified event is that the amount of times of time-out of the reordering timer is greater than or equal to the second threshold. Accordingly, the apparatus 60 for transmitting data further includes:

an accumulation module configured to increase, in response to the event that the reordering timer runs out of time, a time-out counter of the reordering timer by one;

and/or, a resetting module configured to reset, in response to an event that the reordering timer is stopped, a time-out counter of the reordering timer.

Further, in yet another possible embodiment of the disclosure, the specified strategy is the first indication message obtained, and the content of the first indication message includes at least one of the following information: the lower boundary value of the reordering window, the lower boundary value of the reordering window minus one, the lower boundary value of the reordering window plus one, the upper boundary value of the reordering window, the upper boundary value of the reordering window minus one, the upper boundary value of the reordering window plus one, indication information of an ignorable PDCP data packet corresponding to a reordering timer, the maximum amount of ignorable data packets not received, and a serial number of an ignorable data packet not received.

Further, in yet another possible embodiment of the disclosure, the first indication message includes the boundary value N of the reordering window. Accordingly, the updating module 61 includes:

a first adjustment unit configured to adjust, on the basis of the boundary value N of the reordering window in the first indication message, the boundary value of the reordering window to N+M, where M is a preset value, and alternatively, M is a value carried in the first indication message.

Further, in yet another possible embodiment of the disclosure, the first indication message includes the boundary value N of the reordering window. Accordingly, the updating module 61 includes:

a second adjustment unit configured to adjust, on the basis of the boundary value N of the reordering window in the first indication message, the boundary value of the reordering window to N+M in response to determining that a current boundary value of the reordering window is smaller than N+M, where M is a preset value, and alternatively, M is a value carried in the first indication message.

Further, in yet another possible embodiment of the disclosure, the first indication message includes the boundary value of the reordering window and at least one of the following information: the indication information of the ignorable PDCP data packet corresponding to the reordering timer, the maximum amount of the ignorable data packets not received, and the serial number of the ignorable data packet not received. Accordingly, the updating module 61 includes:

a first ignoring unit configured to ignore, in response to determining that the current boundary value of the data reordering window is smaller than or equal to the corresponding boundary value in the first indication message, the PDCP data packet not received and corresponding to the reordering timer;

alternatively, a determination unit configured to determine, in response to determining that the current boundary value of the data reordering window is smaller than or equal to the corresponding boundary value in the first indication message, the amount of the ignorable data packets not received according to the maximum amount of the ignorable data packets not received; and alternatively, a second ignoring unit configured to ignore, in response to determining that the current boundary value of the data reordering window is smaller than or equal to the corresponding boundary value in the first indication message, the data packet not received and corresponding to the serial number of the ignorable data packet not received.

Further, in yet another possible embodiment of the disclosure, the specified strategy is the preset rule. Accordingly, the updating module 61 includes:

a third updating unit configured to update, according to a current service scheduling mode of the PDCP data reception entity, the boundary value of the data reordering window.

Further, in yet another possible embodiment of the disclosure, modes of the updating the boundary value of the data reordering window include at least one of the following updating modes: updating the lower boundary value of the reordering window according to a serial number of a PDCP data packet submitted to a high level, and updating the upper boundary value of the reordering window according to a maximum serial number of the PDCP data packet received.

It is to be noted that description of the above-mentioned method for transmitting data as shown in FIGS. 1, 2, 3, and 6 are also applicable to the apparatus 60 for transmitting data in the example, which will not be repeated herein.

According to the apparatus for transmitting data provided in the example of the disclosure, the current state information of the data reordering window is transmitted to the PDCP data transmission entity, and on the basis of the specified strategy, the boundary value of the data reordering window is updated, where the specified strategy is any one of the following strategies: the first indication message and the preset rule obtained, and the first indication message is configured to indicate the boundary value to be updated of the reordering window to the PDCP data reception entity. In this way, the PDCP data reception entity triggers the PDCP data transmission entity to generate the first indication message according to the current state information of the data reordering window and the current PDCP data packet transmission condition by transmitting the current state information of the data reordering window to the PDCP data transmission entity. Further, the reordering window is updated by comprehensively considering a real-time transmission state of the PDCP data packets and real-time state information of the reordering window of the PDCP data reception entity, and a transmission rate and reliability of the PDCP data packets are further improved.

In order to implement the above examples, the disclosure further provides an apparatus for transmitting data.

FIG. 8 is a schematic structural diagram of another apparatus for transmitting data according to an example of the disclosure, which is applied to a PDCP data transmission entity.

As shown in FIG. 8, the apparatus 70 for transmitting data includes:

a first transmission module 71 configured to transmit a first indication message, configured to instruct a data reception entity to update a data reordering window, to the data reception entity, where the first indication message is configured to indicate a boundary value to be updated of the reordering window to the data reception entity.

In practical use, the apparatus for transmitting data according to the example of the disclosure may be configured in any communication device, so as to execute the above-mentioned method for transmitting data.

According to the apparatus for transmitting data provided in the example of the disclosure, the PDCP data transmission entity transmits the first indication message, configured to instruct the PDCP data reception entity to update the data reordering window, to the PDCP data reception entity, such that the PDCP data reception entity updates the data reordering window according to the first indication message. In this way, the PDCP data reception entity updates the boundary value of the data reordering window according to the specified first indication message of the PDCP data transmission entity, such that when the data packets are transmitted to the plurality of pieces of UE in the PTM mode, the data packets transmitted from the PDCP data transmission entity may fall within the data reordering window of the PDCP data reception entity of each piece of UE all the time, and further loss of the data packets received by PDCP is avoided.

In a possible embodiment of the disclosure, the content of the first indication message includes at least one of the following information: the lower boundary value of the reordering window, the lower boundary value of the reordering window minus one, the lower boundary value of the reordering window plus one, the upper boundary value of the reordering window, the upper boundary value of the reordering window minus one, the upper boundary value of the reordering window plus one, indication information of an ignorable PDCP data packet corresponding to a reordering timer, the maximum amount of ignorable data packets not received, and a serial number of an ignorable data packet not received.

Further, in another possible embodiment of the disclosure, the first transmission module 71 includes:

a sixth transmission unit configured to transmit, in response to obtaining current state information of the data reordering window transmitted from the data reception entity, the first indication message to the data reception entity, where the data transmission entity generates the first indication message on the basis of the state information; and alternatively, a seventh transmission unit configured to transmit, on the basis of a preset rule, the first indication message to the data reception entity.

Further, in yet another possible embodiment of the disclosure, the current state information of the data reordering window includes at least one of the following information: the lower boundary value of the reordering window, the lower boundary value of the reordering window minus one, the lower boundary value of the reordering window plus one, the upper boundary value of the reordering window, the upper boundary value of the reordering window minus one, the upper boundary value of the reordering window plus one, a serial number of a next PDCP data packet to be received, and a serial number of a last received PDCP data packet in the reordering window.

Further, in yet another possible embodiment of the disclosure, the sixth transmission unit is specifically configured to:

obtain the current state information of the data reordering window transmitted from the data reception entity by means of a PDCP control packet;

alternatively, obtain the current state information of the data reordering window transmitted from the data reception entity by means of a PDCP data packet; and alternatively, obtain the current state information of the data reordering window transmitted from the data reception entity by means of a RRC message, where the RRC message includes identity information of the PDCP data reception entity.

Further, in yet another possible embodiment of the disclosure, the identity information of the PDCP data reception entity includes at least one of the following information: a bearer identity, a logical channel identity, a cell group identity, a RLC entity identity, a multicast scheduling identity, and a MBS identity.

Further, in yet another possible embodiment of the disclosure, the sixth transmission unit is further configured to:

obtain, in response to determining that the PDCP data reception entity is a split MBS bearer, the current state information of the data reordering window transmitted from the data reception entity through PTP scheduling.

Further, in yet another possible embodiment of the disclosure, the apparatus 70 for transmitting data further includes:

a third transmission module configured to transmit the second indication message to the data reception entity, where the second indication message is configured to instruct the data reception entity to transmit the current state information of the data reordering window.

Further, in yet another possible embodiment of the disclosure, the third transmission module includes:

an eighth transmission unit configured to transmit the second indication message to the data reception entity by means of the PDCP data packet or the PDCP control packet.

Further, in yet another possible embodiment of the disclosure, the third transmission module includes:

a ninth transmission module configured to transmit the second indication message to the data reception entity by means of the RRC message, where the second indication message includes at least one of the following information: the identity information of the PDCP data reception entity, and indication information configured to indicate whether the PDCP data reception entity transmits the state information of the reordering window.

It is to be noted that the description of the above-mentioned method for transmitting data as shown in FIGS. 4, 5, and 6 are also applicable to the apparatus 70 for transmitting data in the example, which will not be repeated herein.

According to the apparatus for transmitting data provided in the example of the disclosure, in response to obtaining the current state information of the data reordering window transmitted from the PDCP data reception entity, the first indication message is transmitted to the PDCP data reception entity, such that the PDCP data reception entity updates the data reordering window according to the first indication message. In this way, the PDCP data reception entity triggers the PDCP data transmission entity to generate the first indication message according to the current state information of the data reordering window and the current PDCP data packet transmission condition by transmitting the current state information of the data reordering window to the PDCP data transmission entity. Further, the reordering window is updated by comprehensively considering a real-time transmission state of the PDCP data packets and real-time state information of the reordering window of the PDCP data reception entity, and a transmission rate and reliability of the PDCP data packets are further improved.

In order to implement the above examples, the disclosure further provides a communication device.

The communication device according to the example of the disclosure includes a processor, a transceiver, a memory, and an executable program stored in the memory and runnable by the processor, where the processor executes the method for transmitting data according to any one of the above-mentioned technical solutions when running the executable program.

The communication device may be the above-mentioned PDCP data reception entity (for instance, a terminal) or PDCP data transmission entity (for instance, a base station).

The processor may include various types of storage media. The storage media are non-temporary computer storage media, and may continue to store information stored in the communication device after the communication device is powered off. Herein, the communication device includes the PDCP data reception entity or PDCP data transmission entity.

The processor may be connected to the memory by means of a bus, etc., and is configured to read the executable program stored in the memory, which is as shown in at least one of FIGS. 1-6, for instance.

In order to implement the above examples, the disclosure further provides a computer storage medium.

The computer storage medium according to the example of the disclosure stores an executable program. After being executed by a processor, the executable program is capable of implementing the method for transmitting data according to any one of the above-mentioned technical solutions, which is as shown in at least one of FIGS. 1-6 for instance.

Figure 9:
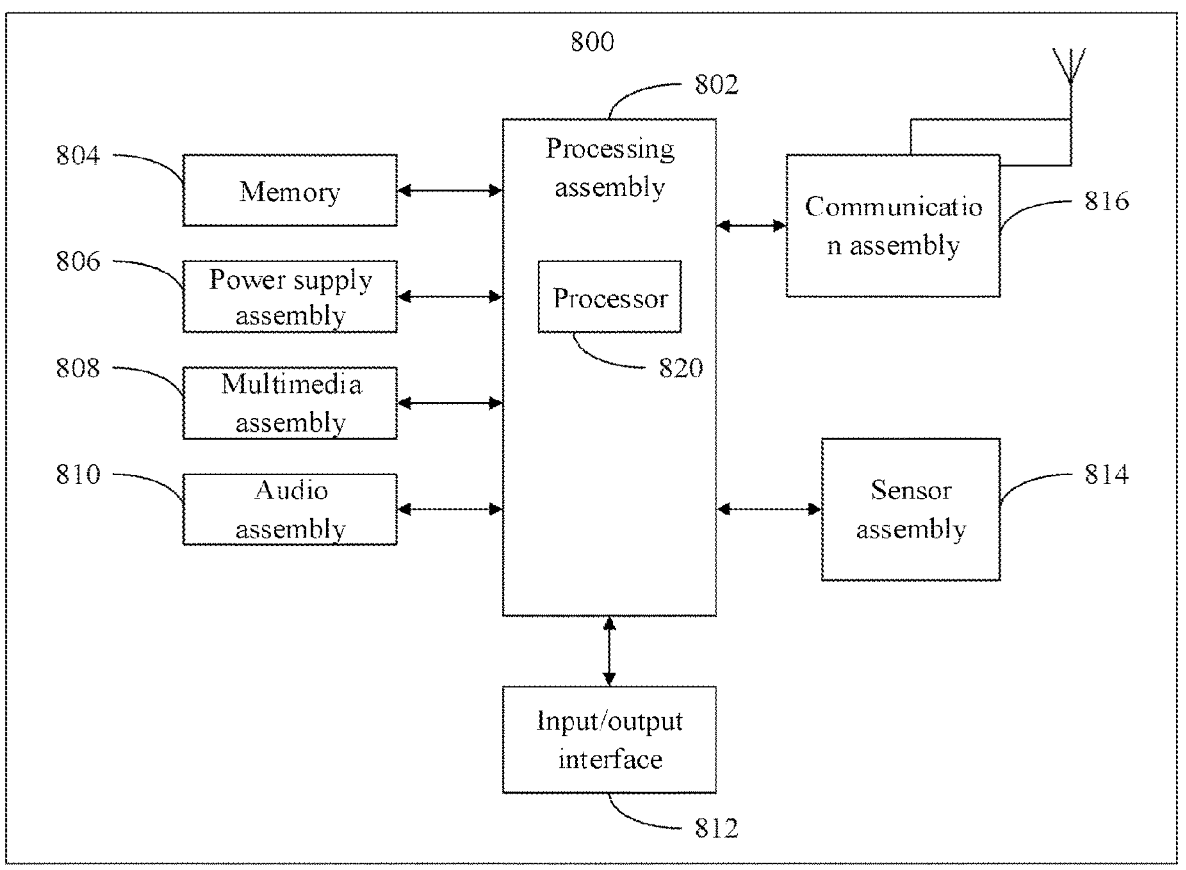
FIG. 9 is a schematic structural diagram of a base station according to an example of the disclosure.

FIG. 9 is a block diagram of UE 800 according to an example of the disclosure. For instance, the UE 800 may be a mobile phone, a computer, a digital broadcast user device, a messaging device, a game console, a tablet device, a medical device, a fitness device, a personal digital assistant, etc.

With reference to FIG. 9, the UE 800 may include at least one of the following assemblies: a processing assembly 802, a memory 804, a power supply assembly 806, a multimedia assembly 808, an audio assembly 810, an input/output (I/O) interface 812, a sensor assembly 814, and a communication assembly 816.

The processing assembly 802 generally controls all operations of the UE 800, such as operations associated with display, telephone call, data communication, camera operation and recording operations. The processing assembly 802 may include at least one processor 820 for executing an instruction, so as to complete all or some steps of the above method. In addition, the processing assembly 802 may include at least one module to facilitate interaction between the processing assembly 802 and other assemblies. For instance, the processing assembly 802 may include a multimedia module to facilitate interaction between the multimedia assembly 808 and the processing assembly 802.

The memory 804 is configured to store various types of data to support operations on the UE 800. Instances of the data include an instruction for any application or method operating on the UE 800, contact data, phone book data, a message, a picture, a video, etc. The memory 804 may be implemented through any type or combination of volatile or non-volatile memory devices, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power supply assembly 806 supplies power to various assemblies of the UE 800. The power supply assembly 806 may include a power management system, at least one power supply, and other assemblies associated with generating, managing and distributing power for the UE 800.

The multimedia assembly 808 includes a screen that provides an output interface between the UE 800 and a user. In some examples, the screen may include a liquid crystal display (LCD) and a touch panel (TP). If the screen includes the touch panel, the screen may be implemented as a touch screen to receive an input signal from the user. The touch panel includes at least one touch sensor to sense touch, slide and gestures on the touch panel. The touch sensor may sense a boundary of a touch or slide operation, and detect wake-up time and pressure related to the touch or slide operation. In some examples, the multimedia assembly 808 includes a front-facing camera and/or a rear-facing camera. When the UE 800 is in an operation mode, such as a shooting mode or a video mode, the front-facing camera and/or the rear-facing camera may receive external multimedia data. Each of the front-facing camera and the rear-facing camera may be a fixed optical lens system or have a focal length and optical zoom capability.

The audio assembly 810 is configured to output and/or input an audio signal. For instance, the audio assembly 810 includes a microphone (MIC). The microphone is configured to receive an external audio signal when the UE 800 is in operation modes such as a call mode, a recording mode and a voice identification mode. The received audio signal may be further stored in the memory 804 or transmitted via the communication assembly 816. In some examples, the audio assembly 810 further includes a speaker configured to output an audio signal.

The I/O interface 812 provides an interface between the processing assembly 802 and a peripheral interface module. The peripheral interface module may be a keyboard, a click wheel, a button, etc. The buttons may include, but are not limited to, a home button, a volume button, a start button, and a lock button.

The sensor assembly 814 includes at least one sensor for providing various aspects of state assessment for the UE 800. For instance, the sensor assembly 814 may detect an on/off state of the UE 800 and relative positioning of the assemblies, such as a display and a keypad of the UE 800, and the sensor assembly 814 may further detect position change of the UE 800 or an assembly of the UE 800, presence or absence of contact between the user and the UE 800, an orientation or acceleration/deceleration of the UE 800, and temperature change of the UE 800. The sensor assembly 814 may include a proximity sensor configured to detect presence of a nearby object without any physical contact. The sensor assembly 814 may further include an optical sensor, such as a complementary metal-oxide-semiconductor (CMOS) or charge-coupled device (CCD) image sensor, which is used in imaging application. In some examples, the sensor assembly 814 may further include an acceleration sensor, a gyroscope sensor, a magnetic sensor, a pressure sensor, or a temperature sensor.

The communication assembly 816 is configured to facilitate wired or wireless communication between the UE 800 and other devices. The UE 800 may access a wireless network based on a communication standard, such as WiFi, the 2nd generation mobile communication technology (2G) or the 3rd generation mobile communication technology (3G), or their combination. In an illustrative example, the communication assembly 816 receives a broadcast signal or broadcast related information from an external broadcast management system via a broadcast channel. In an illustrative example, the communication assembly 816 further includes a near field communication (NFC) module to facilitate short-range communication. For instance, the NFC module may be implemented on the basis of a radio frequency identification (RFID) technology, an infrared data association (IrDA) technology, an ultra wide band (UWB) technology, a Bluetooth (BT) technology, etc.

In an illustrative example, the UE 800 may be implemented by at least one of an application specific integrated circuit (ASIC), a digital signal processor (DSP), a digital signal processing device (DSPD), a programmable logic device (PLD), a field programmable gate array (FPGA), a controller, a microcontroller, a microprocessor, or other electronic components, thus executing the method.

In an illustrative example, a non-transitory computer-readable storage medium including an instruction, such as the memory 804 provided. The instruction may be executed by the processor 820 of the UE 800 so as to complete the method. For instance, the non-transitory computer-readable storage medium may be ROM, a random access memory (RAM), a compact disk (CD)-ROM, a magnetic tape, a floppy disk, an optical data storage device, etc.

Figure 10:
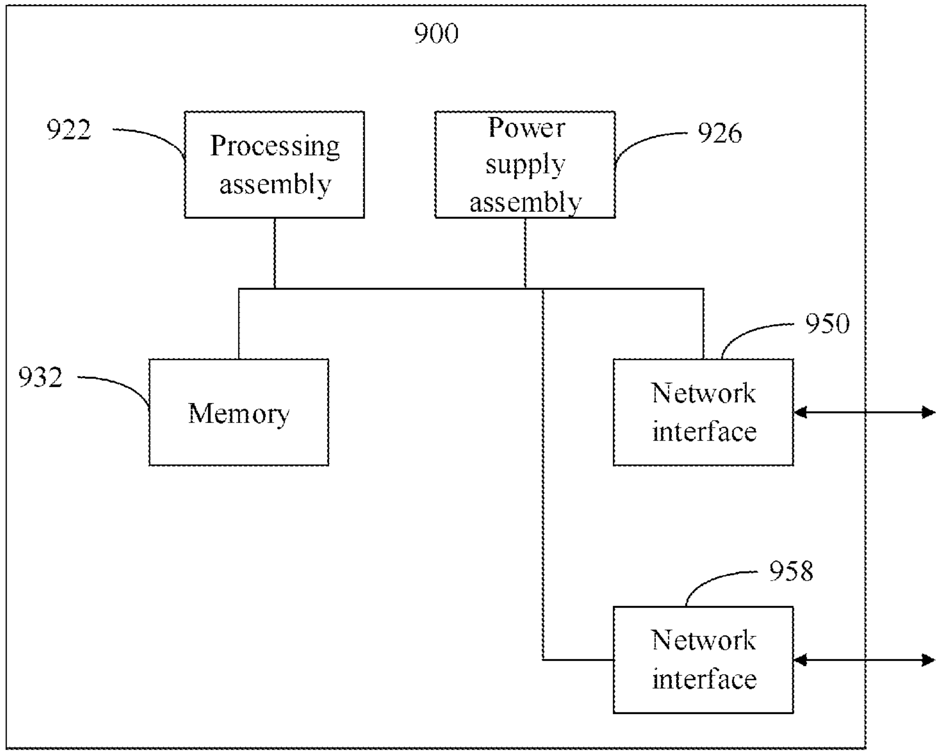
FIG. 10 is a schematic structural diagram of a base station according to an example of the disclosure

FIG. 10 is a schematic structural diagram of a base station according to an example of the disclosure. For instance, a base station 900 may be used as a network device. With reference to FIG. 10, the base station 900 includes a processing assembly 922, which further includes at least one processor, and a memory resource represented by a memory 932, which is configured to store instructions executable by the processing assembly 922, such as applications. The applications stored in the memory 932 may include one or more modules that each corresponds to a group of instructions. In addition, the processing assembly 922 is configured to execute instructions, so as to execute any one of the methods applied to the base station, for instance, the method shown in FIGS. 4-6.

The base station 900 may further include a power supply assembly 926 configured to execute power management of the base station 900, a wired or radio network interface 950 configured to connect the base station 900 to a network, and an input/output (I/O) interface 958. The base station 900 may operate an operating system stored in the memory 932, such as Windows Server™, Mac OS X™, Unix™, Linux™, and FreeBSD™.

Additional non-limiting embodiments of the disclosure include:

Embodiment 1. A method for transmitting data, performed by a packet data convergence protocol (PDCP) data reception entity and including:

updating, based on a specified strategy, a boundary value of a data reordering window, wherein the specified strategy is any one of the following strategies: a first indication message and/or a preset rule obtained, and the first indication message is configured to indicate the boundary value to be updated of the data reordering window to the data reception entity.

Embodiment 2. The method according to embodiment 1, further including:

transmitting current state information of the data reordering window to a data transmission entity, wherein the data transmission entity generates the first indication message based on the state information or determines the preset rule.

Embodiment 3. The method according to embodiment 2, wherein the current state information of the data reordering window includes at least one of the following information: a lower boundary value of the reordering window, the lower boundary value of the reordering window minus one, the lower boundary value of the reordering window plus one, an upper boundary value of the reordering window, the upper boundary value of the reordering window minus one, the upper boundary value of the reordering window plus one, a serial number of a next PDCP data packet to be received, or a serial number of a last received PDCP data packet in the reordering window.

Embodiment 4. The method according to embodiment 2, wherein the transmitting current state information of the data reordering window to a data transmission entity includes:

transmitting the current state information of the data reordering window to the data transmission entity by means of a PDCP control packet; or, transmitting the current state information of the data reordering window to the data transmission entity by means of a PDCP data packet; or, transmitting the current state information of the data reordering window to the data transmission entity by means of a radio resource control (RRC) message, wherein the RRC message includes identity information of the PDCP data reception entity.

Embodiment 5. The method according to embodiment 4, wherein the identity information of the PDCP data reception entity includes at least one of the following information: a bearer identity, a logical channel identity, a cell group identity, a radio link control (RLC) entity identity, a multicast scheduling identity, or a multicast broadcast service (MBS) identity.

Embodiment 6. The method according to any one of embodiments 2-5, wherein the transmitting current state information of the data reordering window to a data transmission entity includes:

transmitting, in response to determining that the PDCP data reception entity is a split MB S bearer, the current state information of the data reordering window to the data transmission entity through point-to-point (PTP) scheduling.

Embodiment 7. The method according to any one of embodiments 2-5, wherein the transmitting current state information of the data reordering window to a data transmission entity includes:

transmitting, in response to monitoring a specified event, the current state information of the data reordering window to the data transmission entity; or, transmitting, in response to monitoring no specified event, the current state information of the data reordering window to the data transmission entity.

Embodiment 8. The method according to embodiment 7, wherein the specified event is at least one of the following events: a second indication message transmitted from the data transmission entity is received, specified update time is reached, the amount of data packets in the reordering window is greater than or equal to a first threshold, a reordering timer runs out of time, or the serial number of times of time-out of the reordering timer is greater than or equal to a second threshold, wherein the second indication message is configured to instruct the data reception entity to transmit the current state information of the reordering window.

Embodiment 9. The method according to embodiment 8, wherein the second indication message is a RRC message, and the second indication message includes at least one of the following information: the identity information of the PDCP data reception entity, or indication information configured to indicate whether the PDCP data reception entity transmits the state information of the reordering window.

Embodiment 10. The method according to embodiment 8, wherein the specified event is that the amount of times of time-out of the reordering timer is greater than or equal to the second threshold, and the method further includes:

increasing, in response to the event that the reordering timer runs out of time, a time-out counter of the reordering timer by one;

and/or, resetting, in response to an event that the reordering timer is stopped, a time-out counter of the reordering timer.

Embodiment 11. The method according to any one of embodiments 1-10, wherein the specified strategy is the first indication message obtained, and a content of the first indication message includes at least one of the following information: the lower boundary value of the reordering window, the lower boundary value of the reordering window minus one, the lower boundary value of the reordering window plus one, the upper boundary value of the reordering window, the upper boundary value of the reordering window minus one, the upper boundary value of the reordering window plus one, indication information of an ignorable PDCP data packet corresponding to the reordering timer, a maximum amount of ignorable data packets not received, or a serial number of an ignorable data packet not received.

Embodiment 12. The method according to embodiment 11, wherein the first indication message includes the boundary value N of the reordering window, and the updating, on the basis of a specified strategy, a boundary value of a data reordering window includes:

adjusting, on the basis of the boundary value N of the reordering window in the first indication message, the boundary value of the reordering window to N+M, wherein M is a preset value, alternatively, M is a value carried in the first indication message.

Embodiment 13. The method according to embodiment 11, wherein the first indication message includes the boundary value N of the reordering window, and the updating, on the basis of a specified strategy, a boundary value of a data reordering window includes:

adjusting, based on the boundary value N of the reordering window in the first indication message, the boundary value of the reordering window to N+M, in response to determining that a current boundary value of the reordering window is smaller than N+M, wherein M is a preset value, or, M is a value carried in the first indication message.

Embodiment 14. The method according to embodiment 11, wherein the first indication message includes the boundary value of the reordering window and at least one of the following information: the indication information of the ignorable PDCP data packet corresponding to the reordering timer, the maximum amount of the ignorable data packets not received, or the serial number of the ignorable data packet not received, and the updating, based on the specified strategy, the boundary value of a data reordering window includes:

ignoring, in response to determining that a current boundary value of the data reordering window is smaller than or equal to the corresponding boundary value in the first indication message, the PDCP data packet not received and corresponding to the reordering timer; or, determining, in response to determining that a current boundary value of the data reordering window is smaller than or equal to the corresponding boundary value in the first indication message, the amount of the ignorable data packets not received according to the maximum amount of the ignorable data packets not received; or, ignoring, in response to determining that a current boundary value of the data reordering window is smaller than or equal to the corresponding boundary value in the first indication message, the data packet not received and corresponding to the serial number of the ignorable data packet not received.

Embodiment 15. The method according to any one of embodiments 1-10, wherein the specified strategy is the preset rule, and the updating, based on the specified strategy, the boundary value of a data reordering window includes:

updating, according to a current service scheduling mode of the PDCP data reception entity, the boundary value of the data reordering window.

Embodiment 16. The method according to embodiment 15, wherein modes of the updating the boundary value of the data reordering window include at least one of the following updating modes: updating the lower boundary value of the reordering window according to a serial number of a PDCP data packet submitted to a upper layer, or updating the upper boundary value of the reordering window according to a maximum serial number of the PDCP data packet received.

Embodiment 17. A method for transmitting data, performed by a PDCP data transmission entity and including:

transmitting a first indication message, configured to instruct a data reception entity to update a data reordering window, to the data reception entity, wherein the first indication message is configured to indicate a boundary value to be updated of the reordering window to the data reception entity.

Embodiment 18. The method according to embodiment 17, wherein a content of the first indication message includes at least one of the following information: a lower boundary value of the reordering window, the lower boundary value of the reordering window minus one, the lower boundary value of the reordering window plus one, an upper boundary value of the reordering window, the upper boundary value of the reordering window minus one, the upper boundary value of the reordering window plus one, indication information of an ignorable PDCP data packet corresponding to a reordering timer, a maximum amount of ignorable data packets not received, or a serial number of an ignorable data packet not received.

Embodiment 19. The method according to embodiment 17, wherein the transmitting a first indication message, configured to instruct a data reception entity to update a data reordering window, to the data reception entity includes:

transmitting, in response to obtaining current state information of the data reordering window transmitted from the data reception entity, the first indication message to the data reception entity, wherein the data transmission entity generates the first indication message on the basis of the state information; or, transmitting, on the basis of a preset rule, the first indication message to the data reception entity.

Embodiment 20. The method according to embodiment 19, wherein the current state information of the data reordering window includes at least one of the following information: a lower boundary value of the reordering window, the lower boundary value of the reordering window minus one, the lower boundary value of the reordering window plus one, an upper boundary value of the reordering window, the upper boundary value of the reordering window minus one, the upper boundary value of the reordering window plus one, a serial number of a next PDCP data packet to be received, or a serial number of a last received PDCP data packet in the reordering window.

Embodiment 21. The method according to embodiment 19, wherein the obtaining current state information of the data reordering window transmitted from the data reception entity includes:

obtaining the current state information of the data reordering window transmitted from the data reception entity by means of a PDCP control packet; or, obtaining the current state information of the data reordering window transmitted from the data reception entity by means of a PDCP data packet; or, obtaining the current state information of the data reordering window transmitted from the data reception entity by means of a radio resource control (RRC) message, wherein the RRC message includes identity information of the PDCP data reception entity.

Embodiment 22. The method according to embodiment 21, wherein the identity information of the PDCP data reception entity includes at least one of the following information: a bearer identity, a logical channel identity, a cell group identity, an RLC entity identity, a multicast scheduling identity, or an MBS identity.

Embodiment 23. The method according to any one of embodiments 19-22, wherein the obtaining current state information of the data reordering window transmitted from the data reception entity includes:

obtaining, in response to determining that the PDCP data reception entity is a split MBS bearer, the current state information of the data reordering window transmitted from the data reception entity through PTP scheduling.

Embodiment 24. The method according to any one of embodiments 19-22, further including:

transmitting a second indication message to the data reception entity, wherein the second indication message is configured to instruct the data reception entity to transmit the current state information of the data reordering window.

Embodiment 25. The method according to embodiment 24, wherein the transmitting a second indication message to the data reception entity includes:

transmitting the second indication message to the data reception entity by means of the PDCP data packet or the PDCP control packet.

Embodiment 26. The method according to embodiment 24, wherein the transmitting a second indication message to the data reception entity includes:

transmitting the second indication message to the data reception entity by means of the RRC message, wherein the second indication message includes at least one of the following information: the identity information of the PDCP data reception entity, or indication information configured to indicate whether the PDCP data reception entity transmits the state information of the reordering window.

Embodiment 27. An apparatus for transmitting data, performed by a PDCP data reception entity and including:

an updating module configured to update, on the basis of a specified strategy, a boundary value of a data reordering window, wherein the specified strategy is any one of the following strategies: a first obtained indication message and/or a preset rule, and the first indication message is configured to indicate a boundary value to be updated of the reordering window to the data reception entity.

Embodiment 28. An apparatus for transmitting data, performed by a PDCP data transmission entity and including:

a first transmission module configured to transmit a first indication message, configured to instruct a data reception entity to update a data reordering window, to the data reception entity, wherein the first indication message is configured to indicate a boundary value to be updated of the reordering window to the data reception entity.

Embodiment 29. A communication device, including: a transceiver; a memory; and a processor connected to the transceiver and the memory separately and configured to control radio signal transceiving of the transceiver by executing a computer-executable instruction on the memory and implement the method for transmitting data according to any one of embodiments 1-16 or 17-26.

Embodiment 30. A computer storage medium, storing a computer-executable instruction, wherein after the computer-executable instruction is executed by a processor, the method for transmitting data according to any one of embodiments 1-16 or 17-26 is implemented.

Those skilled in the art could easily conceive of other implementation solutions of the disclosure upon consideration of the description and practice of the invention disclosed herein. The disclosure is intended to cover any variations, uses or adaptive changes of the disclosure, and these variations, uses or adaptive changes follow the general principles of the disclosure and include common general knowledge or conventional technical means that is not disclosed in the art. The description and the examples are to be regarded as merely illustrative, and the true scope and spirit of the disclosure are indicated by the following claims.

It is to be understood that the disclosure is not limited to a precise structure described above and illustrated in the accompanying drawings, and can have various modifications and changes without departing from the scope. The scope of the disclosure is limited merely by the appended claims.

The invention claimed is:

1. A method for configuring a reordering window, performed by a packet data convergence protocol (PDCP) data reception entity and comprising:

updating, based on a specified strategy, a COUNT value of an edge of a reordering window, wherein the specified strategy is at least one of the following strategies: a first indication message or a preset rule, and the first indication message is configured to indicate a COUNT value to be updated of the edge of the reordering window to the PDCP data reception entity;

wherein the reordering window is a range of COUNT values of a PDCP data packet reordered by the PDCP data reception entity, and the edge of the reordering window comprises an upper edge and a lower edge;

wherein a COUNT value of the lower edge of the reordering window is configured by a variable RX DELIV, and the variable RX DELIV is configured to indicate a COUNT value of a first PDCP data packet not delivered to upper layers; a COUNT value of the upper edge of the reordering window is configured as the COUNT value of the lower edge of the reordering window+a window size of the reordering window (Window Size)−1, that is, the COUNT value of the upper edge of the reordering window=RX DELIV+Window Size−1.

2. The method for configuring the reordering window according to claim 1, further comprising:

transmitting current state information of the reordering window to a data transmission entity, wherein the current state information is used to generate the first indication message or determine the preset rule by the data transmission entity.

3. The method for configuring the reordering window according to claim 2, wherein the current state information of the reordering window comprises at least one of:

the COUNT value of the lower edge of the reordering window, the COUNT value of the lower edge of the reordering window minus one, the COUNT value of the lower edge of the reordering window plus one, the COUNT value of the upper edge of the reordering window, the COUNT value of the upper edge of the reordering window minus one, the COUNT value of the upper edge of the reordering window plus one, a COUNT value of a next PDCP data packet to be received, or a COUNT value of a last received PDCP data packet in the reordering window.

4. The method for configuring the reordering window according to claim 2, wherein transmitting the current state information of the reordering window to the data transmission entity comprises:

transmitting the current state information of the reordering window to the data transmission entity by means of a PDCP control packet; or, transmitting the current state information of the reordering window to the data transmission entity by means of a PDCP data packet; or, transmitting the current state information of the reordering window to the data transmission entity by means of a radio resource control (RRC) message, wherein the RRC message comprises identity information of the PDCP data reception entity.

5. The method for configuring the reordering window according to claim 1, wherein the specified strategy is the first indication message, and a content of the first indication message comprises at least one of:

the COUNT value of the lower edge of the reordering window, the COUNT value of the lower edge of the reordering window minus one, the COUNT value of the lower edge of the reordering window plus one, the COUNT value of the upper edge of the reordering window, the COUNT value of the upper edge of the reordering window minus one, the COUNT value of the upper edge of the reordering window plus one, indication information of an ignorable PDCP data packet corresponding to a reordering timer, a maximum amount of ignorable data packets not received, or a COUNT value of an ignorable data packet not received.

6. A method for configuring a reordering window, performed by a packet data convergence protocol (PDCP) data transmission entity and comprising:

transmitting a first indication message, configured to instruct a PDCP data reception entity to update the reordering window, to the PDCP data reception entity, wherein the first indication message is configured to indicate a COUNT value to be updated of an edge of the reordering window to the PDCP data reception entity;

wherein the reordering window is a range of COUNT values of a PDCP data packet reordered by the PDCP data reception entity, and the edge of the reordering window comprises an upper edge and a lower edge;

wherein a COUNT value of the lower edge of the reordering window is configured by a variable RX DELIV, and the variable RX DELIV is configured to indicate a COUNT value of a first PDCP data packet not delivered to upper layers; a COUNT value of the upper edge of the reordering window is configured as the COUNT value of the lower edge of the reordering window+a window size of the reordering window (Window Size)−1, that is, the COUNT value of the upper edge of the reordering window=RX DELIV+Window Size−1.

7. The method for configuring the reordering window according to claim 6, wherein a content of the first indication message comprises at least one of:

the COUNT value of the lower edge of the reordering window, the COUNT value of the lower edge of the reordering window minus one, the COUNT value of the lower edge of the reordering window plus one, the COUNT value of the upper edge of the reordering window, the COUNT value of the upper edge of the reordering window minus one, the COUNT value of the upper edge of the reordering window plus one, indication information of an ignorable PDCP data packet corresponding to a reordering timer, a maximum amount of ignorable data packets not received, or a COUNT value of an ignorable data packet not received.

8. A communication device, comprising:

a transceiver;

a memory; and a processor communicatively connected to the transceiver and the memory, wherein the processor is configured to:

update, based on a specified strategy, a COUNT value of an edge of a reordering window, wherein:

the specified strategy is at least one of a first indication message or a preset rule, and the first indication message is configured to indicate a COUNT value to be updated of the edge of the reordering window to a packet data convergence protocol (PDCP) data reception entity;

wherein the reordering window is a range of COUNT values of a PDCP data packet reordered by the PDCP data reception entity, and the edge of the reordering window comprises an upper edge and a lower edge;

wherein a COUNT value of the lower edge of the reordering window is configured by a variable RX DELIV, and the variable RX DELIV is configured to indicate a COUNT value of a first PDCP data packet not delivered to upper layers; a COUNT value of the upper edge of the reordering window is configured as the COUNT value of the lower edge of the reordering window+a window size of the reordering window (Window Size)−1, that is, the COUNT value of the upper edge of the reordering window=RX DELIV+Window Size−1.

9. The method for configuring the reordering window according to claim 1, wherein the PDCP data reception entity receives data by any one of: unicast, multicast, or broadcast.

10. The method for configuring the reordering window according to claim 4, wherein the identity information of the PDCP data reception entity comprises at least one of: a bearer identity, a logical channel identity, a cell group identity, a radio link control (RLC) entity identity, a multi-wave scheduling identity, or a multicast broadcast service (MBS) identity.

11. The method for configuring the reordering window according to claim 1, wherein the specified strategy is the preset rule, and updating, based on the specified strategy, the COUNT value of the edge of the reordering window comprises:

updating, according to a current service scheduling mode of the PDCP data reception entity, the COUNT value of the edge of the reordering window.

12. The method for configuring the reordering window according to claim 11, wherein a mode of updating the COUNT value of the edge of the reordering window comprise at least one of:

updating the COUNT value of the lower edge of the reordering window according to a COUNT value of a PDCP data packet delivered to upper layers, or updating the COUNT value of the upper edge of the reordering window according to a maximum COUNT value of the PDCP data packet received.

13. The method for configuring the reordering window according to claim 12, wherein a reordering mode of the PDCP data reception entity comprises any one of: a push window, a pull window, or a combination of a push window and a pull window;

wherein in a case where the reordering mode of the PDCP data reception entity is the push window, the COUNT value of the lower edge of the reordering window is updated according to the COUNT value of the PDCP data packet delivered to the upper layers;

in a case where the reordering mode of the PDCP data reception entity is the pull window, the COUNT value of the upper edge of the reordering window is updated according to a COUNT value of the PDCP data packet received or the maximum COUNT value of the PDCP data packet received; and in a case where the reordering mode of the PDCP data reception entity is the combination of the push window and the pull window, the COUNT value of the lower edge of the reordering window is updated according to the COUNT value of the PDCP data packet delivered to the upper layers, and the COUNT value of the upper edge of the reordering window is updated according to the COUNT value of the PDCP data packet received or the maximum COUNT value of the PDCP data packet received.

14. The method for configuring the reordering window according to claim 13, further comprising:

determining that the PDCP data reception entity receives data by unicast, and determining that the reordering mode of the PDCP data reception entity is the push window; or determining that the PDCP data reception entity receives data by multicast, and determining that the reordering mode of the PDCP data reception entity is the pull window or the combination of the push window and the pull window.

15. The method for configuring the reordering window according to claim 6, wherein the PDCP data transmission entity transmits data by any one of: unicast, multicast, or broadcast.

16. A communication device, comprising:

a transceiver;

a memory; and a processor communicatively connected to the transceiver and the memory, wherein the processor is configured to perform the method for configuring the reordering window according to claim 6.

17. The method for configuring the reordering window according to claim 6, wherein current state information of the reordering window is received by the PDCP data transmission entity by means of a PDCP control packet; or, the current state information of the reordering window is received by the PDCP data transmission entity by means of a PDCP data packet; or, the current state information of the reordering window is received by the PDCP data transmission entity by means of a radio resource control (RRC) message, wherein the RRC message comprises identity information of the PDCP data reception entity.

18. The method for configuring the reordering window according to claim 17, wherein the identity information of the PDCP data reception entity comprises at least one of: a bearer identity, a logical channel identity, a cell group identity, a radio link control (RLC) entity identity, a multi-wave scheduling identity, or a multicast broadcast service (MBS) identity.

19. A non-transitory computer-readable storage medium, storing an executable program, wherein the executable program, when executed by a processor, causes the processor to perform the method according to claim 1.

20. A non-transitory computer-readable storage medium, storing an executable program, wherein the executable program, when executed by a processor, causes the processor to perform the method according to claim 6.

* * * * *